(12) United States Patent
Shkapenyuk et al.

(10) Patent No.: US 10,977,147 B2
(45) Date of Patent: *Apr. 13, 2021

(54) SYSTEM FOR CONTINUOUS MONITORING OF DATA QUALITY IN A DYNAMIC FEED ENVIRONMENT

(71) Applicant: AT&T Intellectual Property I, L.P., Atlanta, GA (US)

(72) Inventors: Vladislav Shkapenyuk, New York, NY (US); Tamraparni Dasu, New Vernon, NJ (US); Divesh Srivastava, Summit, NJ (US); Deborah Swayne, Jersey City, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 180 days.

This patent is subject to a terminal disclaimer.

(21) Appl. No.: 16/257,936

(22) Filed: Jan. 25, 2019

(65) Prior Publication Data
US 2019/0155822 A1 May 23, 2019

Related U.S. Application Data

(63) Continuation of application No. 14/813,403, filed on Jul. 30, 2015, now Pat. No. 10,191,962.

(51) Int. Cl.
*G06F 11/30* (2006.01)
*G06F 16/28* (2019.01)

(52) U.S. Cl.
CPC ........ *G06F 11/3082* (2013.01); *G06F 16/283* (2019.01); *G06F 16/285* (2019.01)

(58) Field of Classification Search
CPC .................................................. G06F 11/3082
See application file for complete search history.

(56) References Cited

U.S. PATENT DOCUMENTS 5,404,488 A 4/1995 Kerrigan et al.
5,517,615 A 5/1996 Sefidvash et al.
(Continued)

FOREIGN PATENT DOCUMENTS

EP 1966729 9/2008

OTHER PUBLICATIONS

Shkapenyuk et al., "Bistro Data Feed Management System," Proceedings of the 2011 international conference on Management of data, Jun. 12-16, 2011. http://www.research.att.com/techdocs/TD_100454.pdf.
(Continued)

*Primary Examiner* — William Spieler
(74) *Attorney, Agent, or Firm* — Hartman & Citrin LLC

(57) ABSTRACT

A system for providing continuous monitoring of data quality in a dynamic feed environment is disclosed. In particular, the system utilizes a feed inspection tool to detect anomalies in data gathering detected from feed metadata and anomalies in data measurement detected based on file contents. In order to do so, the feed inspection tool may aggregate, for a plurality of aggregation intervals, data feeds and associated metadata feeds. Once the data feeds and metadata feeds are aggregated, the feed inspection tool may generate, for a baseline model feed, baseline statistical models by utilizing historical data of the aggregated feeds in sliding windows of different lengths. The feed inspection tool may then identify, for a plurality of monitoring time delays, data outliers by comparing the aggregated feeds with the baseline model feed. A data quality feed based on the data outliers identified may then be generated and published.

20 Claims, 14 Drawing Sheets

(56) References Cited

U.S. PATENT DOCUMENTS

| | | |
|---|---|---|
| 7,418,446 B2 | 8/2008 | Zitaner et al. |
| 8,073,708 B1 | 12/2011 | Igoe et al. |
| 8,200,775 B2 | 6/2012 | Moore |
| 8,290,926 B2 | 10/2012 | Ozzie et al. |
| 8,335,793 B2 | 12/2012 | Young et al. |
| 8,380,677 B1 | 2/2013 | Lansden et al. |
| 8,477,617 B2 | 7/2013 | Abbazia et al. |
| 8,713,149 B2 | 4/2014 | Shkapenyuk et al. |
| 8,740,059 B2 | 6/2014 | Helmin et al. |
| 8,751,538 B1 | 6/2014 | Wheeler et al. |
| 8,813,172 B2 | 8/2014 | Reus et al. |
| 8,977,600 B2 | 3/2015 | Crupi et al. |
| 2008/0319771 A1 | 12/2008 | Shriver-Blake |
| 2009/0063294 A1 | 3/2009 | Hoekstra et al. |
| 2009/0066641 A1 | 3/2009 | Mahajan et al. |
| 2009/0171890 A1 | 7/2009 | Johnson et al. |
| 2011/0154420 A1 | 6/2011 | Korte et al. |
| 2013/0347061 A1 | 12/2013 | Qureshi et al. |
| 2014/0101089 A1 | 4/2014 | Egan et al. |
| 2014/0250153 A1 | 9/2014 | Nixon et al. |
| 2014/0280678 A1 | 9/2014 | Nixon et al. |
| 2015/0121280 A1 | 4/2015 | Slatner et al. |

OTHER PUBLICATIONS

Rundensteiner et al., "Maintaining data warehouses over changing information sources." Communications of the ACM43.6 (2000): 57-62. http://citeseerx.ist.psu.edu/viewdoc/download?doi=10.1.1.6.3763&rep=rep1&type=pdf.

Zhu et al., "Information aggregation-a value-added e-service." Proceedings of the 5th International Conference on Technology, Policy, and Innovation-Theme: Critical Infrastructures. 2001. http://ebusiness.mit.edu/research/papers/106%20SMadnick,%20Siegel%20Information%20Aggregation.pdf.

Soror et al., "Using Self-Regulation Theory to Inform Technology-Based Behavior Change Interventions." System Sciences (HICCS), 2014, 47th Hawaii International Conference, IEEE, 2014. http://ieeexplore.ieee.org/xpls/abs_all.sp?arnumber=6758974.

U.S. Office Action dated Sep. 18, 2017 in U.S. Appl. No. 14/813,403.
U.S. Office Action dated Jan. 18, 2018 in U.S. Appl. No. 14/813,403.
U.S. Office Action dated May 9, 2018 in U.S. Appl. No. 14/813,403.
U.S. Notice of Allowance dated Sep. 13, 2018 in U.S. Appl. No. 14/813,403.

SYSTEM FOR CONTINUOUS MONITORING OF DATA QUALITY IN A DYNAMIC FEED ENVIRONMENT

CROSS REFERENCE TO RELATED APPLICATIONS

This application is a continuation of and claims the benefit of U.S. application Ser. No. 14/813,403, now U.S. Pat. No. 10,191,962, filed Jul. 30, 2015, which is hereby incorporated by reference in its entirety.

FIELD OF THE INVENTION

The present application relates to technologies for data monitoring technologies, data analysis technologies, and network computing technologies, and more particularly, to a system and method for providing continuous monitoring of data quality in a dynamic feed environment.

BACKGROUND

In today's society, users and organizations are increasingly utilizing network and other service providers to gain access to the Internet, request and access various types of content, access software applications, access software services, access large volumes of data, and perform a variety of other tasks and functions. As the number of users and organizations has continued to grow, the amount of data being generated by devices, applications, and processes utilized by such users and businesses continues to grow at a tremendous rate. As a result, big data including various types of data are being collected and analyzed today on an unprecedented scale, and organizations are routinely making important decisions based on data stored in their databases. Massive amounts of network resources and data storage facilities have been utilized to handle big data. Nevertheless, with the huge volume of generated data, the fact velocity of arriving data, and the large variety of heterogeneous data, the veracity or quality of the data in databases is far from ideal.

Currently, many data feeds associated with organizations contain data errors or glitches in many domains, such as, but not limited to, medicine, finance, law enforcement, and telecommunications. Such data errors may have severe consequences to the organizations associated with such data feeds, and may also have severe consequences to those interacting with such organizations. Data errors can often arise throughout the data lifecycle, from data entry through storage, data integration, data analysis, and decision making. Currently existing technologies have focused on detecting and correcting errors in data after the data has been collected in a database or during data integration processes. While currently existing commercial tools provide capabilities for performing record-level data quality checks and data cleansing during batch processes, there is still considerable room for improvement.

SUMMARY

A system and accompanying methods for providing continuous monitoring of data quality in a dynamic feed environment are disclosed. In particular, the system and methods may involve providing enhancements to data feed management system architectures by enabling a publish-subscribe approach to incorporate data quality modules into such data feed management system architectures. Additionally, the system and methods provide temporal extensions to standard statistical techniques so as to adapt such techniques to online data feed monitoring for outlier detection and alert generation at multiple scales along three dimensions which include: aggregation of data feeds at multiple time intervals to detect at varying levels of sensitivity; utilization of multiple lengths of data history for varying the speed at which models adapt to change; and utilization of multiple levels of monitoring delay to address instances of lagged data arrival. In order to accomplish the foregoing, the system and methods include utilizing a feed inspection tool that performs continuous, passive monitoring of data feeds and metadata feeds so as not to introduce any delays in real-time applications that correlate and analyze the data associated with the feeds. The feed inspection tool may detect errors that may enable administrators or systems to quickly remedy any problems associated with incoming feeds, and inform data analysts of any potential issues with newly arrived data.

The feed inspection tool may detect errors and inconsistencies in data feed processes, such as missing or delayed delivery of files in a feed. Additionally the feed inspection tool may detect significant changes in distributions in the data records present in the data feeds. For example, the feed inspection tool may detect the erroneous switching from packets per second to bytes per second in a measurement feed. The feed inspection tool may detect the errors and inconsistencies by continuously analyzing metadata feeds associated with the data feeds. Also, the feed inspection tool may detect changes in distributions in the data records by continuously analyzing the contents of the data feeds. Notably, the feed inspection tool may be configured to build simple, non-parametric statistical models over the most recent data, identified by a sliding window, to predict future trends and identify outliers as significant deviations from predictions. In order to ensure statistical robustness, the statistical models may be built over time-interval aggregated data rather than point-wise data. The feed inspection tool provides the flexibility to account for the variability in data feeds during normal operation, so as to avoid raising unnecessary alerts and to incorporate user-provided feedback on raised alerts. The feed inspection tool accomplishes this by monitoring for outlier detection and alert generation at multiple scales along the three dimensions mentioned above.

In one embodiment, a system for providing continuous monitoring of data quality in a dynamic feed environment is disclosed. The system may include a memory that stores instructions and a processor that executes the instructions to perform various operations of the system. The system may perform an operation that includes subscribing, such as by utilizing a publish-subscribe interface, to data feeds and metadata feeds associated with the data feeds. The system may then perform an operation that includes receiving, from a data feed management system, the data feeds and the metadata feeds. The system may then perform an operation that includes aggregating, for a plurality of aggregation intervals, the data feeds and the metadata feeds into an aggregation feed. Once the feeds are aggregated, the system may perform an operation that includes generating, for a baseline model feed, baseline models at multiple scales by utilizing historical data associated with the aggregation feed in sliding windows of different lengths. The system may then perform an operation that includes identifying, for a plurality of monitoring time delays, data outliers by comparing the aggregation feed for a current aggregation interval to the baseline model feed. Once the data outliers are identified, the system may perform an operation that includes generating a data quality feed based on the data outliers identified. Finally, the system may perform an operation that includes publishing, to the data feed management system, the data quality feed so that the data quality feed may be made accessible to a subscriber subscribing to the data quality feed.

In another embodiment, a method for providing continuous monitoring of data quality in a dynamic feed environment is disclosed. The method may include utilizing a memory that stores instructions, and a processor that executes the instructions to perform the various functions of the method. The method may include subscribing, such as via a publish-subscribe interface, to data feeds and metadata feeds associated with the data feeds. Additionally, the method may include receiving, from a data feed management system, the data feeds and the metadata feeds. Once the data feeds and metadata feeds are received, the method may include aggregating, for a plurality of aggregation intervals, the data feeds and the metadata feeds into an aggregation feed. The method may also include generating, for a baseline model feed, baseline models at multiple scales by utilizing historical data associated with the aggregation feed in sliding windows of different lengths. Once the baseline models are generated, the method may include identifying, for a plurality of monitoring time delays, data outliers by comparing the aggregation feed for a current aggregation interval to the baseline model feed. The method may further include generating a data quality feed based on the data outliers identified. Moreover, the method may include publishing, to the data feed management system, the data quality feed so that the data quality feed is accessible to a subscriber subscribing to the data quality feed.

According to yet another embodiment, a computer-readable device having instructions for providing continuous monitoring of data quality in a dynamic feed environment is provided. The computer instructions, which when loaded and executed by a processor, may cause the processor to perform operations including: subscribing to data feeds and metadata feeds associated with the data feeds; receiving, from a data feed management system, the data feeds and the metadata feeds; aggregating, for a plurality of aggregation intervals, the data feeds and the metadata feeds into an aggregation feed; generating, for a baseline model feed, baseline models at multiple scales by utilizing historical data associated with the aggregation feed in sliding windows of different lengths; identifying, for a plurality of monitoring time delays, data outliers by comparing the aggregation feed for a current aggregation interval to the baseline model feed; generating a data quality feed based on the data outliers identified; and publishing, to the data feed management system, the data quality feed so that the data quality feed is accessible to a subscriber subscribing to the data quality feed.

These and other features of the systems and methods for providing continuous monitoring of data quality in a dynamic feed environment are described in the following detailed description, drawings, and appended claims.

DETAILED DESCRIPTION OF THE INVENTION

Figure 1:
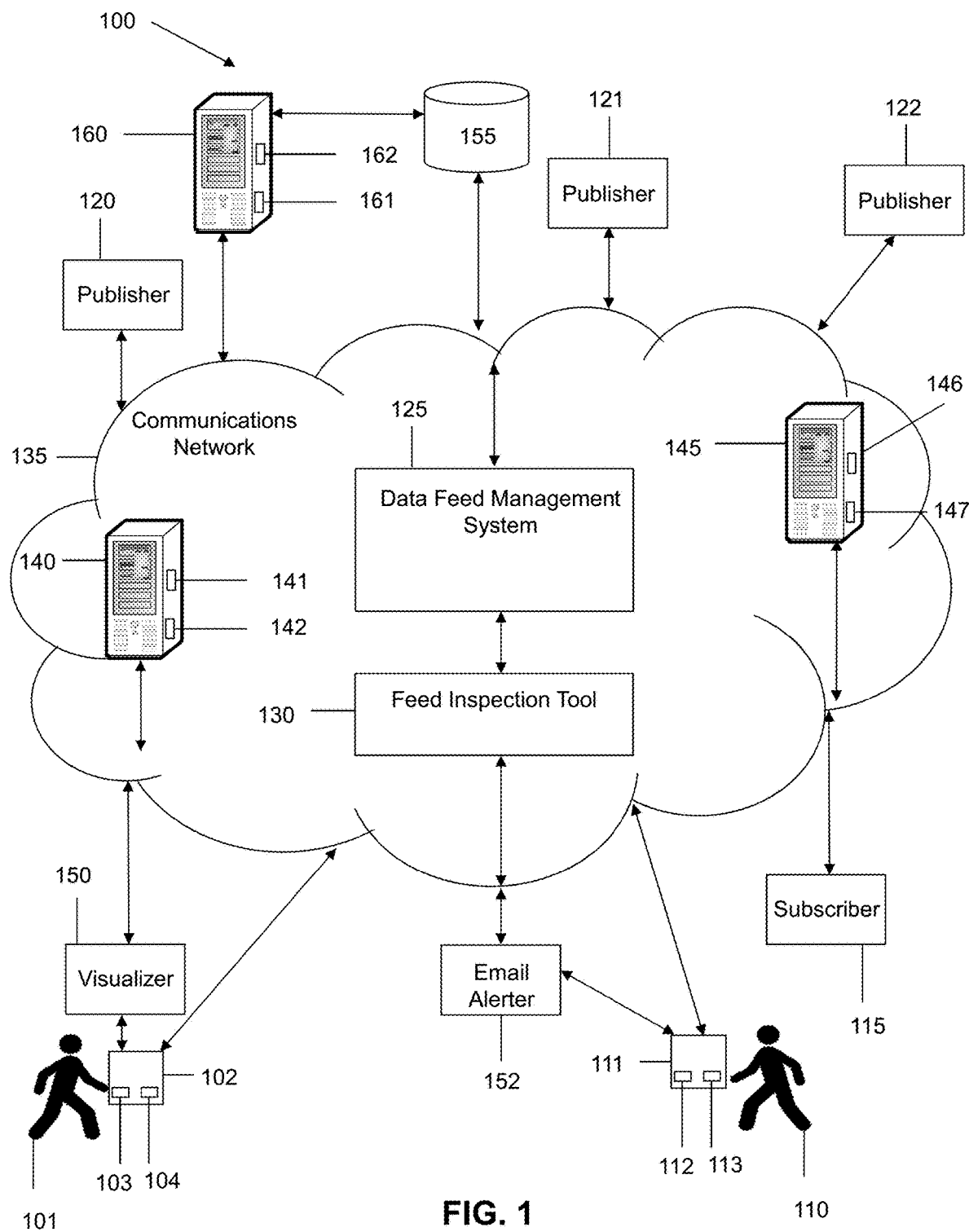
FIG. 1 is a schematic diagram of a system for providing continuous monitoring of data quality in a dynamic feed environment according to an embodiment of the present disclosure.

A system 100 and accompanying methods for providing continuous monitoring of data quality in a dynamic feed environment are disclosed. In particular, the system 100 and methods may involve providing enhancements to data feed management system architectures by enabling a publish-subscribe approach to incorporate data quality modules into such data feed management system architectures. Also, the system 100 and methods may provide temporal extensions to standard statistical techniques so as to adapt the techniques to online data feed monitoring for outlier detection and alert generation at multiple scales along three dimensions which include: aggregation of data feeds at multiple time intervals to detect at varying levels of sensitivity; utilization of multiple lengths of data history for varying the speed at which models adapt to change; and utilization of multiple levels of monitoring delay to address instances of lagged data arrival. In order to accomplish the foregoing, the system 100 and methods include utilizing a feed inspection tool 130 that performs continuous, passive monitoring of data feeds and metadata feeds. The feed inspection tool 130 does this in a way that does not introduce delays in real-time applications that correlate and analyze the data associated with the feeds. Notably, the feed inspection tool 130 may detect errors that may enable administrators or systems to rapidly remedy any problems associated with incoming feeds, and inform data analysts of any potential issues with newly arrived data.

The feed inspection tool 130 may detect errors and inconsistencies in data feed processes, such as missing or delayed delivery of files in a feed. Additionally the feed inspection tool 130 may detect significant changes in distributions in the data records present in the data feeds. For example, the feed inspection tool 130 may detect the erroneous switching of packets per second to bytes per second in a measurement feed. The feed inspection tool 130 may detect the errors and inconsistencies by continuously analyzing metadata feeds associated with the data feeds, and detect the changes in the distributions in data records by continuously analyzing the contents of the data feeds. The feed inspection tool 130 may be configured to build simple, non-parametric statistical models 520 over the most recent data, identified by a sliding window, to predict future trends and identify outliers as significant deviations from predictions. In order to ensure statistical robustness, the statistical models 520 may be built over time-interval aggregated data rather than point-wise data. The feed inspection tool 130 may provide the flexibility to account for the variability in data feeds during normal operation, so as to avoid raising unnecessary alerts 530 and to incorporate user-provided feedback on raised alerts 530. The feed inspection tool 130 may accomplish this by monitoring for outlier detection and alert generation at multiple scales along the three dimensions mentioned herein and as illustrated in graph 500 shown in FIG. 5.

The first dimension may be the aggregation time interval 505, which may determine the granularity at which errors may be detected. A short time interval allows for the detection of fine-granularity errors, but may introduce considerable noise (i.e., variance) into the process. A long aggregation time interval may allow for robust predictions, but may mask compensating errors (e.g., fewer files in one time unit and more files in the next time unit, within the same time interval). As a result, detecting outliers using multiple aggregation time intervals may enable the feed inspection tool 130 to effectively deal with this issue. The second dimension may be the sliding window length, which may determine the extent of history used to build the predictive model. A long window might not allow the feed inspection tool 130 to quickly identify new errors, while a short window may lead to normal fluctuations being detected as outliers. As a result, detecting outliers using multiple sliding window lengths may enable the feed inspection tool 130 to effectively deal with this issue. The third dimension may be the monitoring time delay, which may determine how quickly errors can be detected and reported. A short monitoring time delay may allow the feed inspection tool 130 to quickly compare the model prediction with the (aggregated) observation, but may not account for normal variability in feed delivery schedules. A long monitoring time delay may ensure that late feed arrivals are accounted for, but may be too late for an administrator to take remedial actions. Thus, detecting outliers using multiple monitoring time delays may enable the feed inspection tool 130 to effectively deal with this issue.

Enabling the feed inspection tool 130 to effectively monitor multiple feeds continuously and detect outliers at multiple scales necessitates the sampling of data feeds, especially voluminous, high velocity feeds. While traditional sampling is performed at the record level, this might not be efficiently performed on data feeds, since it would require parsing the content of all the files in the feed into records to extract the sampled records. For efficiency, the feed inspection tool 130 may sample files from a data feed, then parse and analyze all the records in the sampled files. This procedure may provide similar robustness to record level sampling in practice. In order to support this functionality, the data feed management system 125 has been enhanced from traditional data feed management systems to be able to efficiently create derived feeds with sampled files, based on file level metadata.

Notably, the feed inspection tool 130 may be configured to be utilized with any type of data feed management system 125 because the feed inspection tool 130 is an independent feed quality monitoring tool, which does not need to be embedded within the data feed management system 125. This approach enables the feed inspection tool 130 to work with various types of data feed management systems 125, particularly those that implement publish-subscribe interfaces. Additionally, the feed inspection tool 130 does not require changes in the data feed management system 125 to support feed quality monitoring, which simplifies its operational deployment. Furthermore, the feed inspection tool may be configured to not introduce any processing delays into real-time feed delivery, even if the data quality analysis is computationally expensive.

As shown in FIG. 1, a system 100 for providing continuous monitoring of data quality in a dynamic feed environment is disclosed. The system 100 may be configured to support, but is not limited to supporting, cloud computing services, content delivery services, satellite services, telephone services, voice-over-internet protocol services (VoIP), software as a service (SaaS) applications, gaming applications and services, productivity applications and services, mobile applications and services, and any other computing applications and services. The system may include a first user 101 that may utilize a first user device 102 to access content, data feeds, metadata feeds, and services, or to perform a variety of other functions. As an example, the first user 101 may utilize first user device 102 to transmit signals to subscribe, such as via a publish-subscribe interface, to various types of feeds from the data feed management system 125. The first user device 102 may include a memory 104 that includes instructions, and a processor 103 that executes the instructions from the memory 104 to perform the various operations that are performed by the first user device 102. The processor 103 may be hardware, software, or a combination thereof. In certain embodiments, the first user device 102 may be a computer, a laptop, a tablet device, a phablet, a server, a mobile device, a smartphone, a smart watch, or any other type of computing device.

Similarly, the system 100 may also include a second user 110 that may utilize a second user device 111 to also access content, data feeds, metadata feeds, and services, and to perform a variety of other functions. The second user device 111 may be utilized to transmit signals to request various types of content, data feeds, and metadata feeds from the data feed management system 125. The second user device 111 may include a memory 112 that includes instructions, and a processor 113 that executes the instructions from the memory 112 to perform the various operations that are performed by the first user device 111. The processor 113 may be hardware, software, or a combination thereof. In certain embodiments, the second user device 111 may be a computer, a laptop, a tablet device, a phablet, a server, a mobile device, a smartphone, a smart watch, or any other type of computing device.

In certain embodiments, first user device 102 and the second user device 111 may have any number of software applications stored thereon. For example, the first and second user devices 102, 111 may include cloud-based applications, database applications, gaming applications, internet-based applications, browser applications, mobile applications, productivity applications, video applications, music applications, streaming media applications, social media applications, any other type of applications, or a combination thereof. In certain embodiments, the software applications may include one or more graphical user interfaces so as to enable the first and second users 101, 110 to readily interact with the software applications. The software applications may also be utilized by the first and second users 101, 110 to interact with the data feed management system 125, the feed inspection tool 130, any device in the system 100, or any combination thereof.

Figure 2:
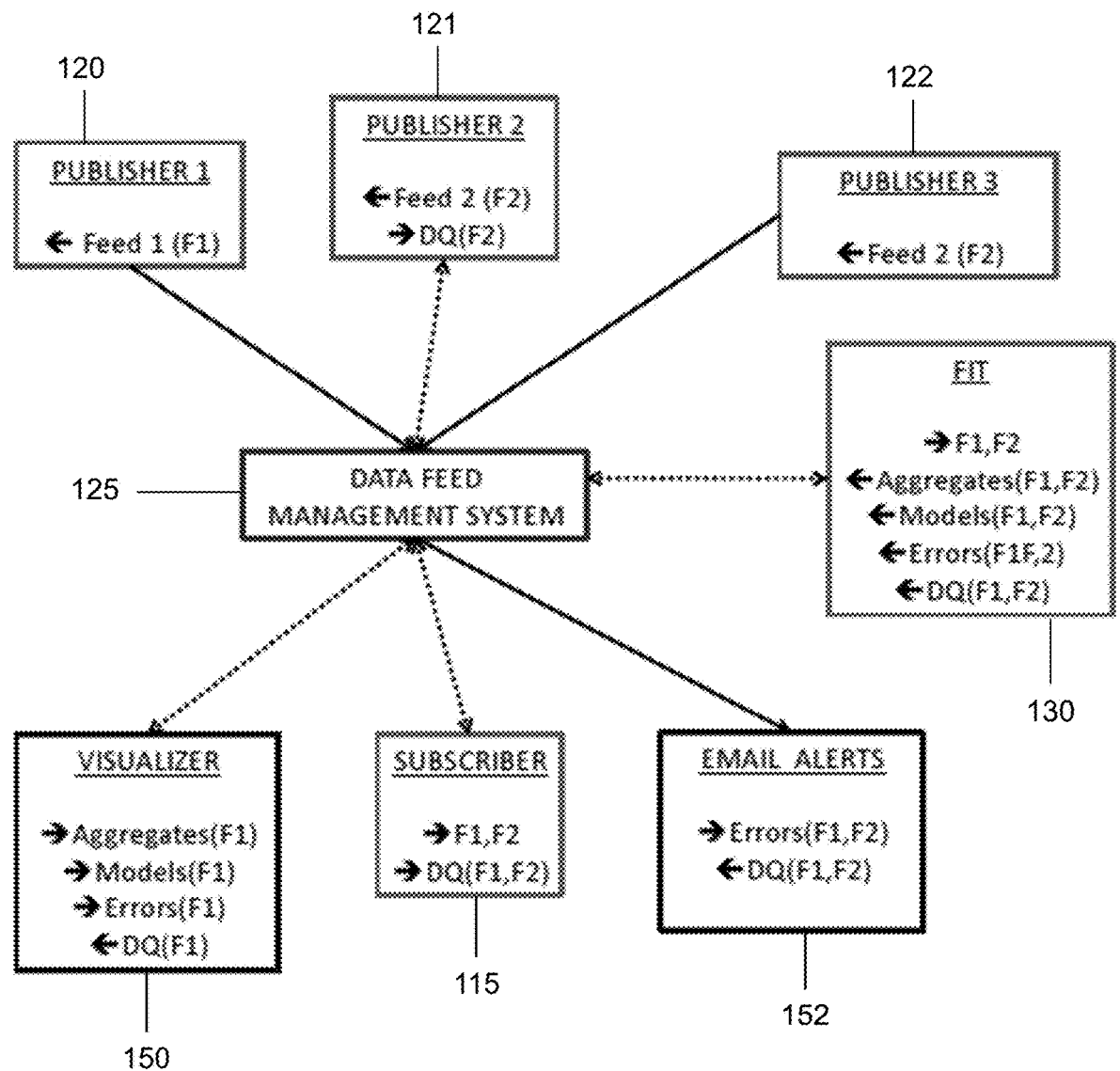
FIG. 2 illustrates the data feed management system of FIG. 1, which features multiple publishers and subscribers.
Figure 3:
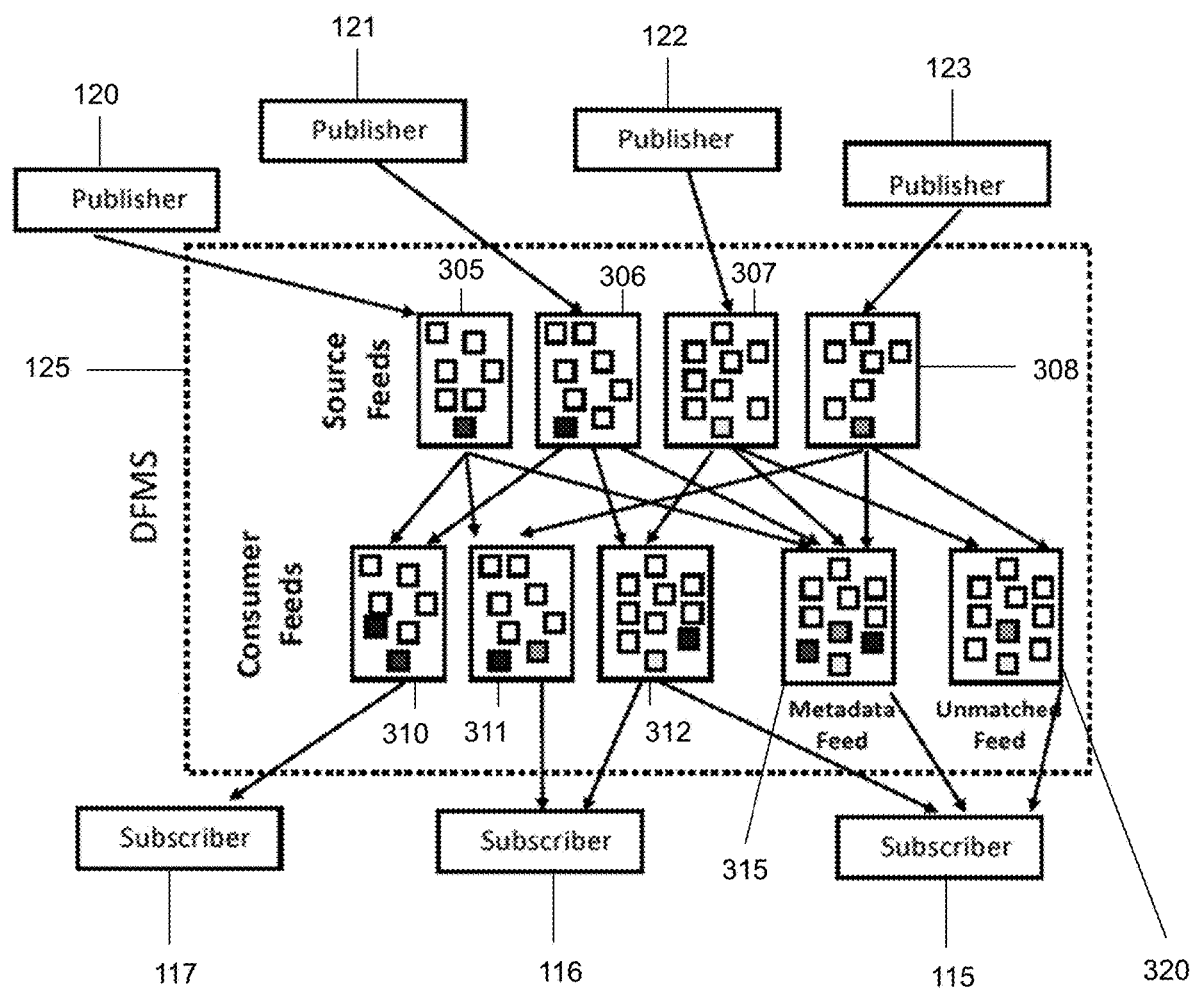
FIG. 3 illustrates the reorganization of incoming files from a source feed to a consumer feed in the data feed management system of FIG. 1.

The system 100 may also include one or more subscribers 115, 116, 117 that may be configured to subscribe to one or more data feeds, metadata feeds, logical feeds, data quality feeds, any other type of feed, or any combination thereof. The subscribers 115-117 may be configured to subscribe to one or more feeds managed by the data feed management system 125 through a publish-subscribe interface implemented by the data feed management system 125. In certain embodiments, the subscribers 115-117 may subscribe to feeds published by the publishers 120-123, the feed inspection tool 130, any device, any program, or any combination thereof. For example, as shown in FIG. 2, subscriber 115 may subscribe to feed 1 (F1), feed 2 (F2), and the data quality feed (F1, F2). As another example, as shown in FIG. 3, subscriber 115 may subscribe to logical consumer feed 312, the metadata feed 315, and the unmatched feed 320. Subscriber 116 may subscribe to logical consumer feeds 311 and 312, and subscriber 117 may subscribe to logical consumer feed 310. Each of the logical consumer feeds 310-312 may be created from the source feeds 305-308, and each may organized in a way to include files that match the needs of the subscribers 115-117. In certain embodiments, the subscribers 115-117 may publish their own data feeds, metadata feeds, logical feeds, data quality feeds, or other feeds via the publish-subscribe interface so that other subscribers 115-117, the feed inspection tool 130, or even the publishers 120-123 may access their feeds from the data feed management system 125. For example, the subscribers 115-117 may modify the data quality feeds the obtain from the feed inspection tool 130 and published the modified versions of the data quality feeds back to the data feed management system 125. In certain embodiments, each subscriber 115-117 may be a computer, a mobile device, a software application, a computer process, a tablet, a smartphone, any device, or any combination thereof.

The system 100 may also include one or more publishers 120, 121, 122, 123 that publish, such as via a publish-subscribe interface implemented by the data feed management system 125, one or more data feeds, metadata feeds, data quality feeds, any data feed, or any combination thereof. For example, as shown in FIG. 2, publisher 120 may publish feed 1 (F1), publisher 121 may publish feed 2 (F2), and publisher 122 may published feed 2 (F2). As another example, as shown in FIG. 3, publisher 120 may publish source feed 305, publisher 121 may publish source feed 306, publisher 122 may publish source feed 307, and publisher 123 may publish source feed 308. In particular, the publishers 120-123 may deliver data feed files to the data feed management system 125 with each file explicitly labeled as belonging to one of the source feeds 305-308. Each source feed 305-308 may be a stream of raw files that may include any number of files, and the files may include any number of records. Each metadata feed 315 may include information identifying each source feed 305-308, information identifying each logical consumer feed 310-312, information identifying the file contents of each source feed 305-308, file format information, data schemas, timestamps associated with the source feeds 305-308, information identifying the number of files and/or records in the source feeds 305-308, any other information, or any combination thereof. The published data feeds may be managed by the data feed management system 125 and may be subscribed to by the subscribers 115-117, the feed inspection tool 130, any device, any program, any process, or any combination thereof. In certain embodiments, the publishers 120-123 may subscribe to feeds published by other publishers 120-123, to feeds published by the subscribers 115-117, to feeds published by the feed inspection tool 130, to any other feeds, or any combination thereof. In certain embodiments, each publisher 120-123 may be a computer, a mobile device, a software application, a server, a computer process, a tablet, a smartphone, any device, or any combination thereof.

In addition to including subscribers 115-117 and publishers 120-123, the system 100 may also include a data feed management system 125 that implements a publish-subscribe interface that enables publishers 120-123 and subscribers 115-117 to publish feeds and subscribe to feeds respectively. In particular, the data feed management system 125 may serve as an intermediary for the publishers 120-123 to maintain interactions with the subscribers 115-117, and may be responsible for routing the source data streams 305-308 to subscribers 115-117. The data feed management system 125 may be configured to provide reliable, continuous data delivery to databases, streaming data warehouses, software applications, devices, the subscribers 115-117, the feed inspection tool 130, or any combination thereof. Additionally, the data feed management system 125 may be configured to receive source feeds 305-308 from the publishers 120-123, feeds from the feed inspection tool 130, feeds from the subscribers 115-117, feeds from any device, feeds from any program, or any combination thereof.

In certain embodiments, the data feed management system 125 may be configured to utilize the publish-subscribe interface to efficiently process incoming data feeds (e.g., real-time streams, periodic data, and ad hoc data) from a large number of publishers 120-123, identify and organize logical consumer feeds 310-312 from the source feeds 305-308 based on a flexible specification language, organize a metadata feed 315 from the sources feeds 305-308, organize an unmatched feed 320 that includes files that are not matched to one of the logical consumer feeds 310-312, and reliably distribute the feeds to remote subscribers 115-117 and/or to the feed inspection tool 130. The data feed management system 125 may identify and organize the logical consumer feeds 310-312 by utilizing a flexible feed definition language to disaggregate the source feeds 305-308 into their constituent files. In certain embodiments, the data feed management system 125 may be a computer, a software application, a computer process, a server, any type of device, or any combination thereof.

FIG. 3 illustrates an overview of how data feeds flow through the data feed management system 125. The publishers 120-123 may deliver the data feed files to the data feed management system 125 with each file explicitly labeled as belonging to one of the source feeds 305-308. Upon receipt of a new file, the data feed management system 125 may utilize a file classifier program to match the new file to one of the logical consumer feeds 310-312, and may stage the logical consumer feeds 310-312 for delivery to all interested subscribers 115-117 and/or the feed inspection tool 130. Files that do not match any of the defined logical consumer feeds may be placed in the unmatched feed 320, which may also be subscribed to by the subscribers 115-117 and/or the feed inspection tool 130. While traditional subscribers 115-117 may not necessarily be interested in the unmatched feed 320, the feed inspection tool 130 may make use of the unmatched feed 320 to identify data feed anomalies and outliers as described in this description.

The data feed management system 125 may support file metadata as a first class citizen and allow cooperating producers and publishers 120-123 to attach metadata to all the files posted to the source feeds 305-308. Even when metadata has not been attached, the name of the file often contains useful information. In such an instance, the data feed management system 125 may include an extraction mechanism that extracts the file name metadata. Notably, both explicit and extracted metadata may be posted to the metadata feed 315, which may be subscribed to by the subscribers 115-117 and the feed inspection tool 130, to add to their understanding of the incoming files. Additionally, the metadata feed 315 may be utilized by the feed inspection tool 130 to perform outlier detection. The data feed management system 125 may be responsible for a further step in data processing, which may entail the scalable delivery of the logical consumer feeds 310-312 to the subscribers 115-117 and to the feed inspection tool 130. The logical consumer feeds 310-312 may be delivered by utilizing a variety of supported protocols, which may include, but are not limited to, SCP, SFTP, and HTTP. Subscribers 115-117 may choose to receive every file in a logical consumer feed 310-312 or a configurable sample of those files. For example, the subscriber 115 may choose a configurable sample of the files when the full feed rate provides more files than the subscriber 115 is able to handle. The configuration language utilized in the system is flexible enough to define samples in at least two ways: (a) a random sample based on a hash of the metadata fields, or (b) a longitudinal (panel) sample created by hashing on selected file metadata fields. The feed inspection tool 130, which is described in further detail below, may take advantage of either sampling strategy to reduce the cost of file content analysis while still maintaining reasonable accuracy.

The data feed management system 125 may be integrated with the feed inspection tool 130 in the following manner. The feed inspection tool 130 fits into the architecture of the data feed management system 125 and utilizes the publish-subscribe interface to interact with the rest of the system 100. The feed inspection tool 130 may act like a regular subscriber 115-117 to receive the metadata feed 315 and any other selected feeds, either in their entirety or sampled. The feed inspection tool 130 may be a computer program, a computer, a server, any device, any process, or a combination thereof. Additionally, the feed inspection tool 130 can also act in the role of a publisher. Rather than providing an interface for applications to query feed quality information, the feed inspection tool 130 may post the results of data quality analysis back into the data feed management system 125 using predefined data quality feeds. This may allow for the layering of a variety of different data quality applications such as visualizers 150, alerting applications, such as email alerter 152, data cleaners and others on top of the output produced by the feed inspection tool 130. It also allows for the sharing of the feed inspection tool 130 output with other subscribers 115-117 and the first and second users 101, 110, who might want to design their own plots or alerts.

For each logical consumer data feed F registered in the data feed management system 125, a number of special data feeds may be defined that carry data quality information. The special data feeds may be as follows: 1. Multi-scale temporal aggregates for use in aggregation feed A(F): The feed inspection tool 130 generates temporal aggregates for multiple aggregation intervals. This allows the feed inspection tool 130 to monitor feeds at several scales to detect problems that may only show up at one particular level of aggregation. A(F) may contain summary statistics and signatures that could be useful to other subscribers 115-117 for generating feed reports. 2. Multi-scale feed inspection tool 130 model parameters for baseline model feeds M(F): The feed inspection tool 130 may build models M(F) at multiple scales by utilizing A(F) historical data in sliding windows of different lengths. 3. Multi-scale feed inspection tool 130 outliers, E(F): The feed inspection tool 130 tests the most recent set of aggregates A(F) against the appropriate model parameters in M(F) and a generates a data outlier feed E(F) when the feed behavior deviates from the expected behavior. The outliers may be generated for different monitoring time delays to allow for minor variations in data arrival. 4. Data quality metrics, DQ(F): The feed inspection tool 130 uses the data outliers E(F) as the basis for data quality metrics related to missing or incomplete data, the number of alerts and their severity, and the proportion of alerts out of the number tested.

FIG. 2 illustrates the flow of data feeds and associated data quality feeds between publishers and subscribers via the data feed management system 125. Publisher 120 publishes data feed 1 (F1), publisher 121 publishes data feed 2 (F2) and subscribes to data quality feed DQ(F2), and publisher 122 publishes data feed 2 (F2). The feed inspection tool 130 subscribes to data feeds F1 and F2, and publishes aggregation feed A(F1,F2), model feed M(F1,F2), error/outlier feed E(F1,F2), and data quality feed DQ(F1,F2) to the data feed management system 125. The visualizer 150 is shown as subscribing to feeds A(F1), M(F1), E(F1) and as publishing data quality feed DQ(F1) to the data feed management system 125. The subscriber 115 is shown as subscribing to data feeds F1, F2, and to data quality feed DQ(F1,F2). The email alerter 152 is shown as subscribing to error feed E(F1,F2) and as publishing data quality feed DQ(F1,F2).

Figure 4:
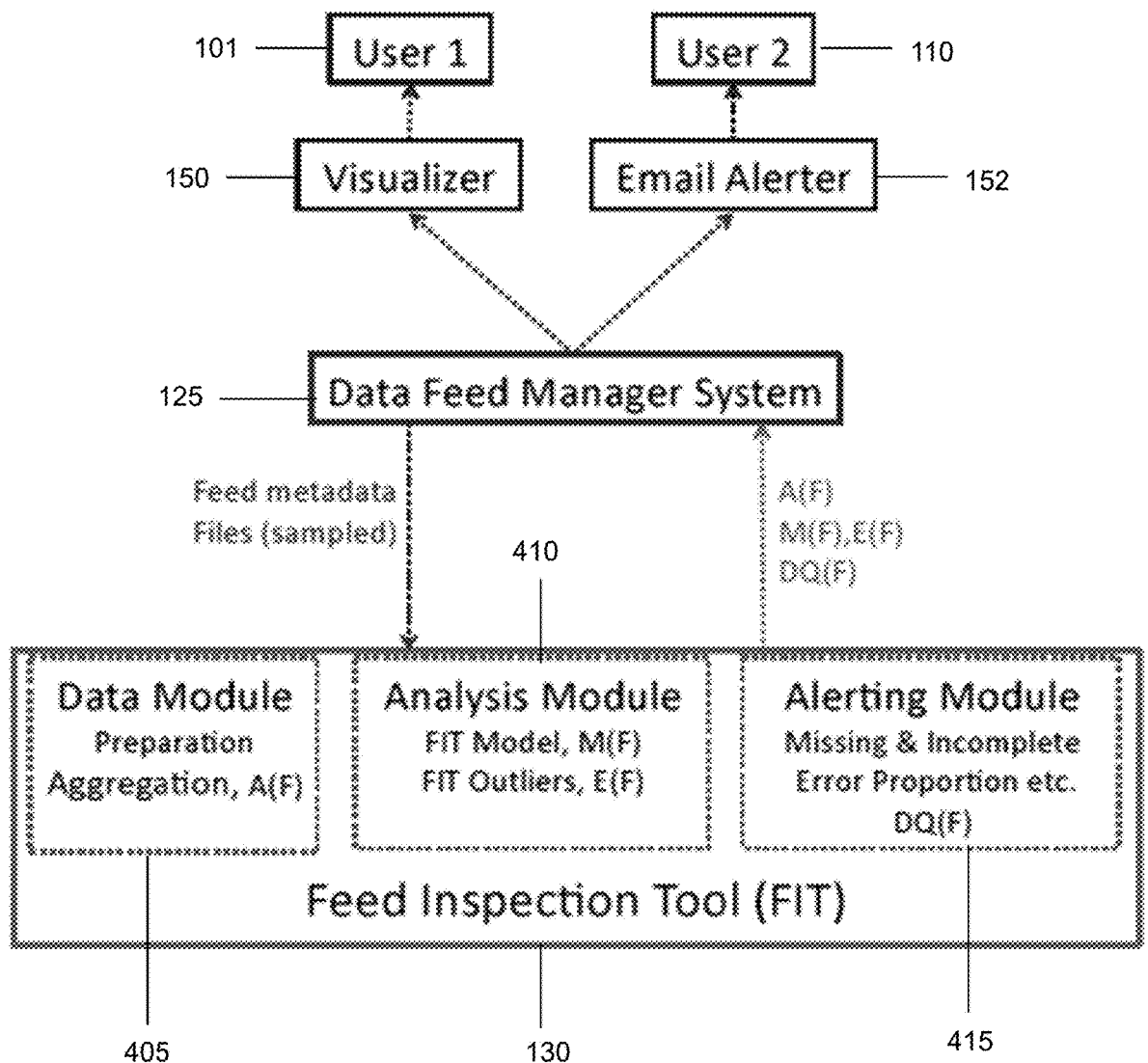
FIG. 4 illustrates various modules of the feed inspection tool utilized in the system of FIG. 1.

The feed inspection tool 130 may be utilized to detect anomalous data from two distinct perspectives: anomalies in data gathering detected from feed metadata 315 and anomalies in data measurement based on file contents. The feed inspection tool 130 may utilize summaries of metadata, including, but not limited to, file counts, average file size, and average inter-arrival times, and also descriptive statistics of file content, e.g., trimmed mean or median of various attributes, to build models 520 of feed behavior and detect anomalies. The architecture of the feed inspection tool 130 is illustratively shown in FIG. 4. In particular, the feed inspection tool 130 may include a data module 405, an analysis module 410, and an alerting module 415. In the data module 405, the feed inspection tool 130 acquires data, formats the data, and aggregates the data at one or more temporal scales. In the analysis module 410, the feed inspection tool 130 reads the aggregated data and generates model statistics and outliers for each level of aggregation. The alerting module 415 may be utilized by the feed inspection tool 130 to combine the output of the models with user requirements to prepare human-readable reports.

With regard to the data module 405, the first step in the feed inspection tool's 130 data pipeline is to acquire the data. The data module 405 may have subscribed to the data feeds via the data feed management system 125, in which case the data feeds are delivered to the feed inspection tool 130, or the data module 405 may pull the data feeds from a website or other source at regular intervals. The data may consist solely of feed metadata 315 or it may include some or all of the data files that comprise the data feed stream. In either case, the feed inspection tool 130 identifies two sets of variables: the group-by variables (categorical variables to be used for grouping, such as, but not limited to, a time interval, source, and record type) and the quantitative variables to be summarized (such as number of files, file size, and inter-arrival time). These variables may be present in the data feeds or derived from the data feeds. The data module 405 then aggregates the data from the data feeds based on different aggregation intervals, computing statistical summaries (measures of centrality such as, but not limited to, mean, trimmed mean and median; measures of dispersion such as, but not limited to, standard deviation and Median Absolute Deviation (MAD); and quantiles) for the quantitative variables for each combination of group-by variables.

Figure 8:
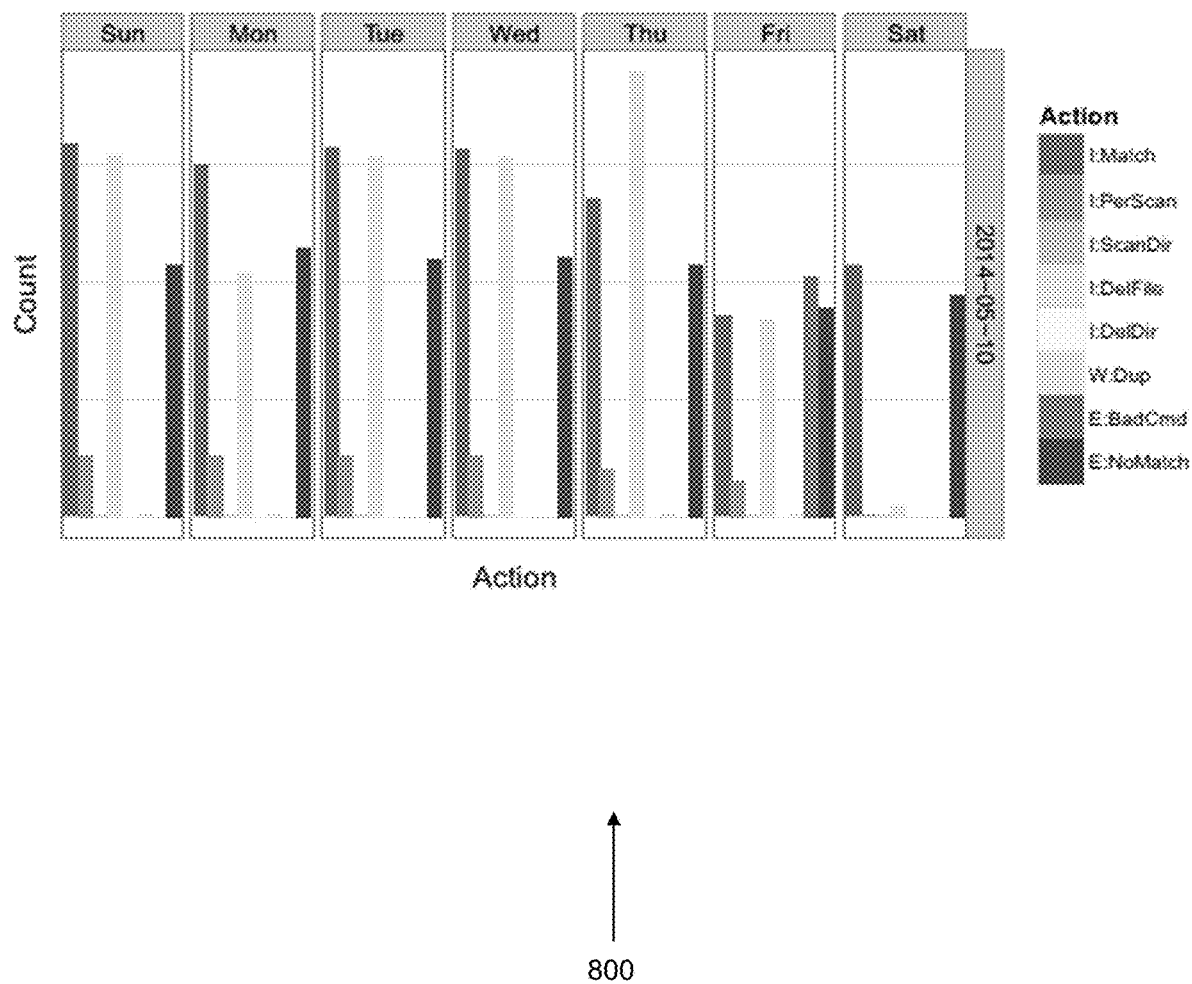
FIG. 8 illustrates a graph including unmatched feeds.

The granularity of aggregation often determines the sensitivity of statistical models and outlier detection. Multi-scale aggregation is important because applications have individual needs. Some focus on transient but potentially catastrophic outliers that can be captured only at finer levels of temporal aggregation (e.g. 5 minutes), while others are interested in systematic issues that persist even after aggregation over longer intervals such as hours and days. In certain embodiments, the subscribers 115-117 of the feed inspection tool 130 may find aggregation intervals between thirty minutes to three hours to be useful. The data module 405 may be the publisher of the multi-scale temporal aggregate feed A(F), which may be published to the data feed management system 125. These aggregates may be a key input to the next stage, but they have substantial use in their own right. For example, subscribers 115-117 to the feed inspection tool 130 can utilize the aggregate feed A(F) as the basis for reports, to generate feed signatures or to even create plots, such as shown in the plot 800 provided in FIG. 8.

With regard to the analysis module 410, the analysis module 410 takes as input the aggregates from the aggregation feed A(F) created by the data module 405 and performs the following operations. First, the analysis module 410 may build baseline modules M(F) 520 using a sliding window of history 510. The amount of history used i.e. sliding window length, may determine the ability to adapt. Too little history may make the models 520 variable and noisy while too much history may make the models 520 slow to adapt to changes in statistical properties of the feed. The feed inspection tool models 520 may rely on statistical summaries of centrality (mean, median, trimmed mean) and dispersion (variance, median absolute deviation) among other types of statistics. Variable transformations are a part of the model building task as well. The feed inspection tool models 520 may be adapted from well-known moving average and time decay models, but have been extended in novel ways to incorporate monitoring data feeds at multiple temporal scales. The models $M_t(F)$ at time t are typically of the form:

$$E(T(A_t(F))) = \sum_{g \in G} [\beta_g(M_{t-1}(F)) + \epsilon_t] * I_g(A_t(F))$$

where the model is the expected value of some functional statistic T estimated from the parameters $\beta_g$ of the model at the previous time t. The indicator function $I_g$ identifies the group to which a particular value of the aggregate $A_t(F)$ belongs to. The parameters may depend on the group g (e.g. time-of-day, day-of-week, feed, source) and the sliding window, in addition to the level of aggregation. The error $\epsilon_t$ may depend on the sampling distribution of the statistic T but could also depend on g even though it is not explicitly denoted. When the sampling distribution of T is not known, the feed inspection tool 130 may utilize bootstrap methods to compute the error distribution.

The analysis module 410 may also test the statistical characteristics of the data in the current aggregation interval against the most recently computed baseline models 520 and identify data outliers, E(F) that are statistically different from the model values. In certain embodiments, the analysis module 410 may be the publisher of the models M(F) and outliers E(F) to be used by the alerting module 415 or to be subscribed to by other applications. The visualizer 150 may be one of the subscribers of E(F), and may utilize E(F) to generate time series plots, such as those found in FIGS. 6 and 7. The visualizer 150 may be a program, computer, device, process, or any combination thereof, that may be utilized to generate visuals of any of the data traversing the system 100. For example, the visualizer 150 may generate plots, graphs, reports, or any type of visual to indicate data outliers, data errors, feed characteristics, or any combination thereof. The visualizer 150 may also publish anything generated by the visualizer 150 back to the data feed management system 125 for use by subscribers 115-117 and/or the feed inspection tool 130. The visualizer 150 may be subscribed to by the first and second users 101, 110 as well.

The alerting module 415 of the feed inspection tool 130 may be the creator and publisher of the data quality feed, DQ(F). The outliers E(F) generated by the analysis module 410 may be data and model driven, and not necessarily of interest to all subscribers 115-117. Additionally, the alerting module 415 permits the publication of alerts 530 at different scales so that subscribers 115-117 can customize logical data quality feeds to alerts 530 in order to derive a variety of data quality metrics for monitoring the health of the data. For instance, missing and incomplete data alerts 530 may be published by email alerter 152 via email, along with interpretive text for the use of the data manager. The email alerter 152 may be a program, computer, device, process, or any combination thereof, that may be utilized to transmit emails including any of the alerts 530, any of the data traversing the system 100, or any combination thereof. Another data quality metric is the proportion of outliers, e.g., on the right side of FIG. 11. The spike in outliers may correspond to the erratic behavior in the underlying data shown in the graph 900 shown in FIG. 9.

In addition, the feed inspection tool 130 may permit monitoring at multiple scales, to account for minor delays in data arrival. Delayed data may result in immediate alerts (too little data), but may disappear once the data arrives and fills in the gaps. Some users might want to act on these immediately while others might wait for the alerts to stabilize. Monitoring feeds at multiple scales of time delay is one way of addressing this issue. Alerts 530 computed with different scales of time delay can be simultaneously posted to DQ(F) with exact time delay encoded as file metadata. Subscribers 115-117 may then define logical alert feeds within the data feed management system 125 to select only those alerts 530 computed with desired time delay. These logical alert feeds configured within the data feed management system 125 can change over time as application requirements evolve. For example, certain subscribers 115-117 may switch to a longer monitoring delay because they may expect a small portion of the data to be lagged by around for a certain period of time, such as by half an hour. Based on the foregoing, the feed inspection tool 130 pipeline is parallelizable by partitioning incoming data and metadata feeds and the architecture of the feed inspection tool 130 is capable of handling a very high number of feeds and data volumes.

The communications network 135 of the system 100 may be configured to link each of the devices in the system 100 to one another, and be configured to transmit, generate, and receive any information and data traversing the system 100. In one embodiment, the communications network 135 may include any number of servers, databases, or other componentry. The communications network 135 may be configured to communicatively link with the first user device 102, the second user device 111, the subscribers 115-117, the publishers 120-123, the data feed management system 125, the feed inspection tool 130, the modules 405, 410, 415, the server 140, the server 145, the visualizer 150, the email alerter 152, the database 155, the server 160, or any combination thereof. The communications network 135 may also include and be connected to a cloud-computing network, a wireless network, an ethernet network, a satellite network, a broadband network, a cellular network, a private network, a cable network, the Internet, an internet protocol network, a multiprotocol label switching (MPLS) network, a content distribution network, any network or any combination thereof. In one embodiment, the communications network 135 may be part of a single autonomous system that is located in a particular geographic region, or be part of multiple autonomous systems that span several geographic regions.

Notably, the functionality of the system 100 may be supported and executed by using any combination of the servers 140, 145, and 160. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 145 may include a memory 146 that includes instructions, and a processor 147 that executes the instructions from the memory 146 to perform the various operations that are performed by the server 145. In certain embodiments, the servers 140, 145, and 160 may be network servers, routers, gateways, computers, mobile devices or any other suitable computing device. In certain embodiments, the servers 140, 145 may be communicatively linked to the communications network 135, any network, any device in the system 100, or any combination thereof.

The database 155 of the system 100 may be utilized to store and relay information that traverses the system 100, cache content that traverses the system 100, store data about each of the devices in the system 100 and perform any other typical functions of a database. In certain embodiments, the database 155 may be connected to or reside within the communications network 135, any other network, or a combination thereof. Additionally, the database 155, in certain embodiments, may serve as a repository for data feeds, metadata feeds, data quality feeds, baseline model feeds, aggregation feeds, or any other type of feed that may be accessed by the communication network 135, the feed inspection tool 130, any of the subscribers 115-117, or by any other appropriate device, program, and/or system. In certain embodiments, the database 155 may serve as a central repository for any information associated with any of the feeds in the system 100. Furthermore, the database 155 may include a processor and memory or be connected to a processor and memory to perform the various operations associated with the database 155. In certain embodiments, the database 155 may be connected to servers 140, 145, 160, feed inspection tool 130, the data feed management system 125, the publishers 120-123, the subscribers 115-117, the first user device 102, the second user device 111, or any combination thereof. The database 155 may also store information and metadata obtained from the system 100, store metadata and other information associated with the first and second users 101, 110, store reports generated based on the data quality feeds, store statistical models 520 utilized by the feed inspection tool 130, store user profiles associated with the first and second users 101, 110, store device profiles associated with any device in the system 100, store communications traversing the system 100, store user preferences, store information associated with any device or signal in the system 100, store information relating to patterns of usage relating to the first and second user devices 102, 111, store any information traversing the system 100, or any combination thereof. Furthermore, the database 155 may be configured to process queries sent to it by any device in the system 100.

Operatively, the system 100 may provide continuous monitoring of data quality in a dynamic feed environment as shown in the following exemplary scenarios. In a first example scenario, the feed inspection tool 130 may be utilized for mobility feeds. A mobility data lake typically consists of a variety of high volume, high velocity data feeds that arrive in real time. Prior to the feed inspection tool 130 being deployed, the first and second users 101, 110 may have monitored the arrival of the data feeds by casually "eyeballing" daily aggregates of file counts, often only after a problem in the data feeds had been reported. Since several days may have passed by then, it may have been too late to request the publishers 120-123 to retransmit the data feeds. If the data could still be acquired from the publishers 120-123, analyses and reports may have to be re-run to include delayed data or at least account for incompleteness. Such issues increase costs and cycle times. As a result, the feed inspection tool 130 may be deployed to create custom DQ(F) feeds tailored to the needs of the first and second users 101, 110, or subscribers 115-117.

In this example, the feed inspection tool 130 may be configured to monitor feed metadata 315 published by the data feed management system 125. The metadata 315 may pertain to files that have been published (pub events) to a landing directory and files that have been delivered (del events) to a subscriber 115-117. Successful deliveries may have a 2XX HTTP code (e.g. 204), while unsuccessful delivery attempts may have a non-2XX code (e.g. 503 or 100). Other metadata may include, but is not limited to, feed identifier, file size, file delivery time, and a unique "publish ID." The feed inspection tool models 520 may be based on a sliding window of 112 days i.e., 16 weeks (so as to capture both day-of-week and time-of-day effects), and at an hourly level of aggregation. The subscribers 115-117 may have settled on a 45 minute monitoring time delay to ensure that the data for the prior hour is complete before processing. The feed inspection tool 130 may create the following DQ(F) feeds of outliers and alerts for the subscriber in two example ways: (a) Email alerts such as the one shown below are sent when needed. The emails may include interpretive text indicating the severity of the alert (critical, major, warning, status).

Sample email:
Subject: 2 critical alerts, 2 status alerts
CRITICAL: FEED 1; Expected N del files, received 2%
CRITICAL: FEED 1; Expected M pub files, received 2%
STATUS: FEED 2; Expected del mean size X MB; received 85%

The above sample email may alert a data manager (e.g. first user 101) that FEED 1 had two critical alerts. For example, too few files may have been delivered and too few files may have been published. The data manager may also be alerted that FEED 2 may also merit investigation based on the reduced average file size.

Figure 6:
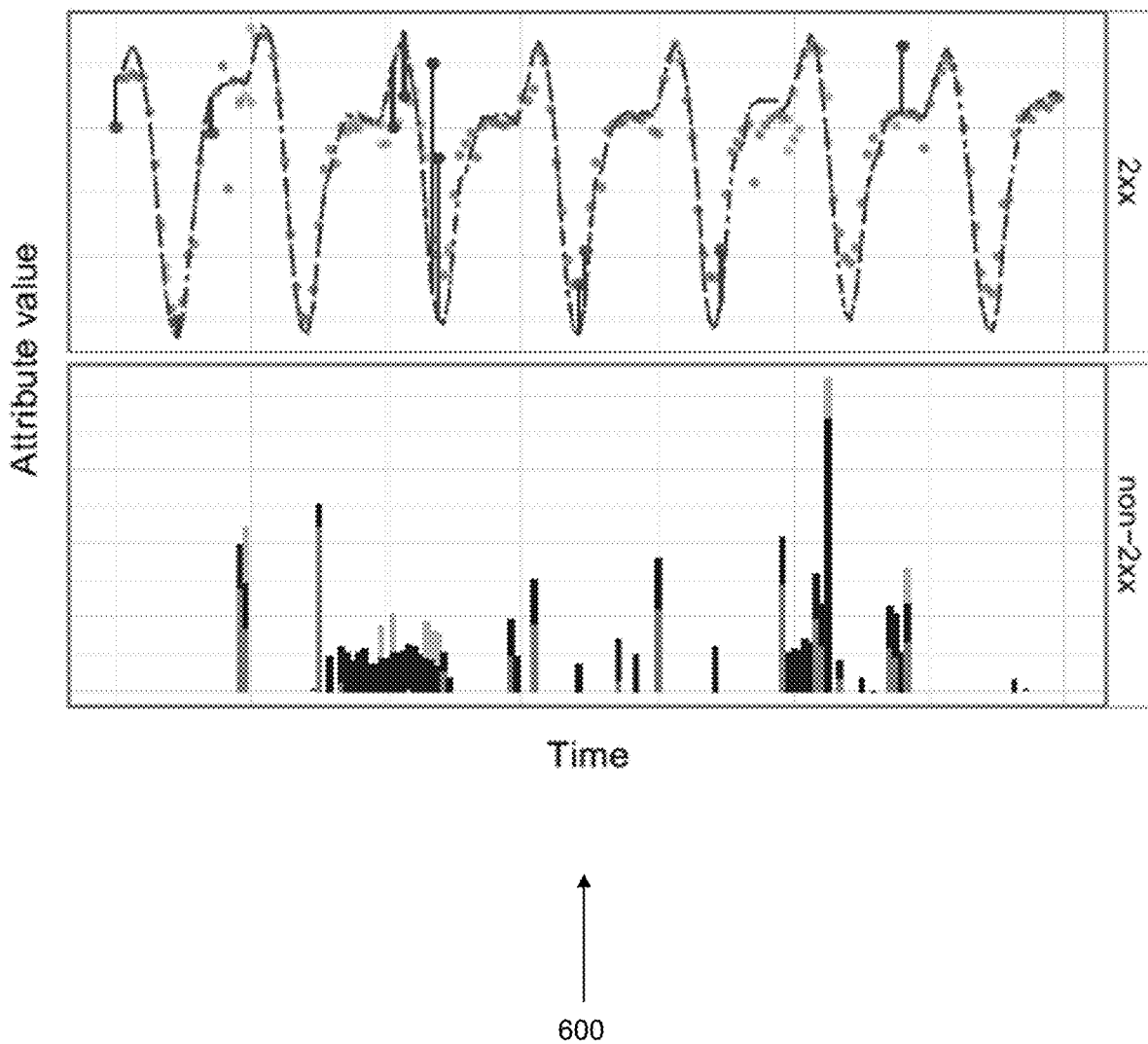
FIG. 6 illustrates a visualization of feed characteristics during a normal time period.
Figure 7:
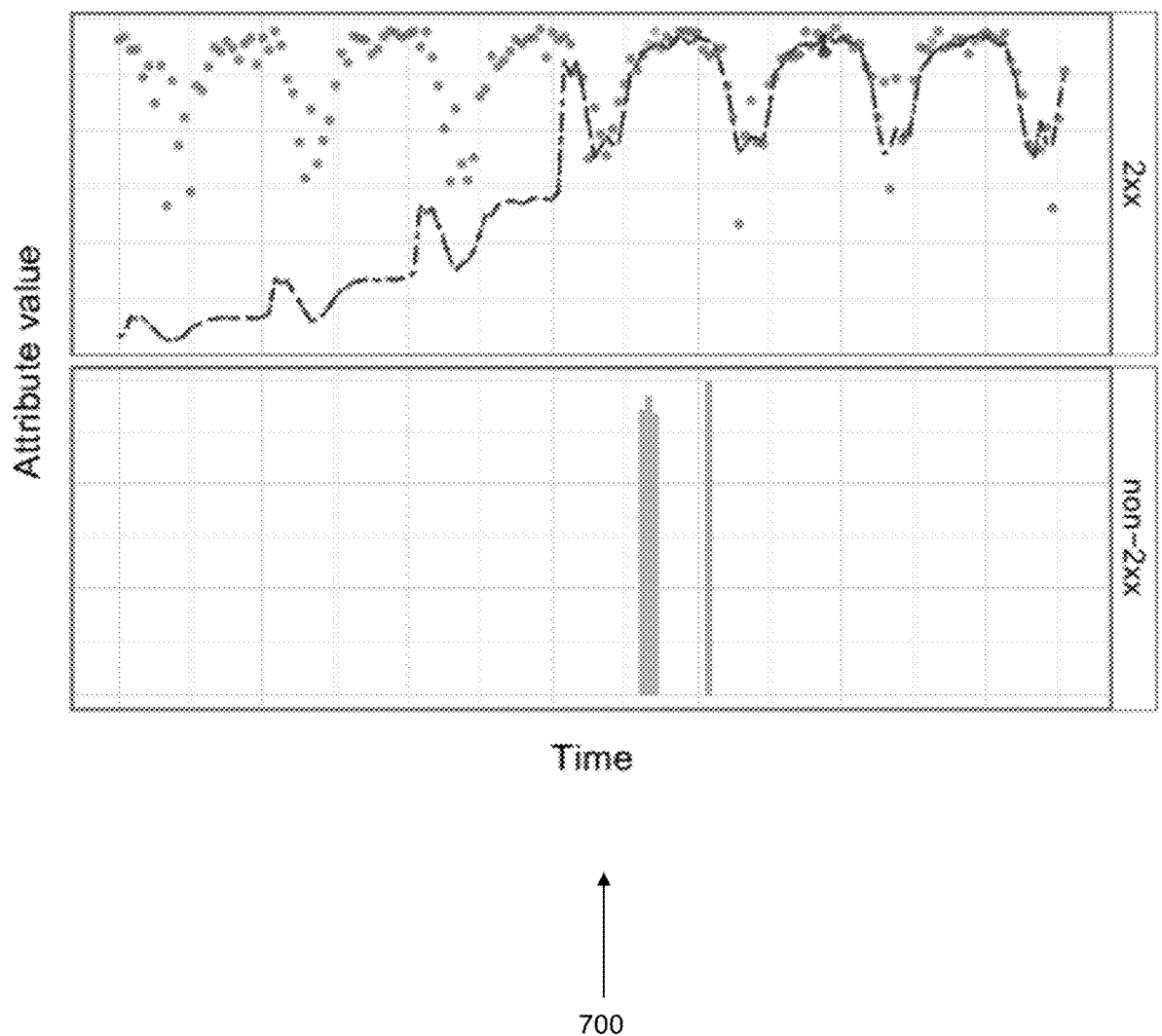
FIG. 7 illustrates a visualization of feed characteristics during a period when models are rapidly adapting to a significant level shift in the attribute distribution.

(b) Graphics in which outliers are highlighted in time series plots may be made available on a web resource (see graphs 600 and 700 in FIGS. 6 and 7 respectively). The normal feed behavior may be exemplified in FIG. 6, where the dashed lines in the top panel indicate the expected behavior of the feed and the dots may represent the observed behavior. The bottom panel in FIG. 6 contains the counts of different types of HTTP error codes. In this particular plot, feed behavior is captured through a 10% trimmed mean of the file size averaged over the files in an aggregation interval of one hour. The weekly and hourly cyclical variations are apparent in the peaks and troughs. Each outlier (i.e., unexpected mean file size) may be represented by a dot attached by a line to the corresponding expected value. There are only a handful of outliers. If there is a structural change in the way files are delivered, each file delivered may now be orders of magnitude larger than it has been, and there may be correspondingly fewer files. Nevertheless, the feed inspection tool 130 may rely on the ability to meaningfully compare new data with historical data. Because the feed inspection tool 130 utilizes multi-scale sliding windows, the subscriber 115-117 may adapt quickly by switching from a logical feed with sliding window of 112 days to one with 7 days. As a result, subscribers 115-117 of the feed inspection tool 130 may react quickly and may start using appropriate models and alerts as seen in the plot in FIG. 7. The new model now has much flatter peaks and troughs, which reflects the intention of the change in feed delivery, namely to even out the file sizes, thus distributing the load on the data feed management system 125 in a more uniform manner.

In a second exemplary scenario, the feed inspection tool 130 may be utilized for unmatched feeds 320. The data feed management system 125 may utilize pattern matching to classify files into user-defined feeds, such as logical consumer feeds 310-312. Some files may remain unclassified and may be assigned to the unmatched feed 320, as shown in the plot 800 of FIG. 8. This row of plots may represent a week, and each individual panel, may represent a day. The bar plot for each day shows the distribution of data feed management system 125 actions. The I:Match bar corresponds to files that were successfully assigned to feeds. At the other extreme, E:NoMatch bar corresponds to files that could not be matched. The other bars represent other types of data feed management system 125 actions. Even on Tuesday or Wednesday, when the feeds were relatively well-behaved, the percentage of unmatched files is at least 30%. The unmatched feed 320 is important for at least two reasons in this scenario: (1) Known files could be labeled "unmatched," resulting in incomplete data that could bias downstream analytics and produce incorrect results. (2) The unmatched feed 320 could contain important files hitherto unknown to subscribers 115-117. The filename matching process could fail for a variety of reasons. For example, there could be a glitch in the pattern matching as a result of a very small change to the name of a file, such as a change in the formatting of an embedded time stamp. As another example, there could be a transient system problem. Whatever be the reason, unmatched files merit further analysis. Two examples are provided herewith:

(1). Incompatible Configuration Files: Based on an inspection of the DQ(F) feed an interesting phenomenon may be found. For example, in FIG. 8, there is illustrated an unusually prevalence of E:BadCmd (the second to last bar in the Friday panel) and a corresponding increase in the proportion of E:NoMatch actions—almost as many as matched, whose number had fallen as well. In other words, files that normally would have been assigned to customary feeds were instead included with the unmatched feed 320. This could result in losses or gaps to the feed the files would normally have been assigned to and would give a false picture of activity in those feeds. One possible reason for this occurring could be that the feed may have been switched to a different server which had an older configuration file. As a result, some of the filename patterns may not have been processed. The gaps in the data may only be noticed much later. Through careful monitoring of the feed inspection tool's 130 DQ(F) feeds, such problems may be addressed in a timely manner.

(2). Classifying Unmatched Files: The metadata feed for the files in the unmatched feed 320 may contain useful information that can help assign them to feeds, such as, but not limited to, filename, size, and arrival time. The feed inspection tool's 130 output DQ(F) may include a stream of unmatched files labeled by the known feeds that they are most similar to. The feed inspection tool 130 may perform the labeling in the following manner. The feed inspection tool 130 may group the unmatched files based on filename patterns and run clustering algorithms based on metadata, such as, but not limited to, file counts, file sizes and inter-arrival durations, and compare the results for the unmatched clusters with the results for matched files. This particular information may assist subscribers 115-117 in identifying an important feed that may have been thought to have redundant information, but in reality contained critical alerts that may have been overlooked.

In a third exemplary scenario, the feed inspection tool 130 may be utilized for measuring data quality of file contents. Given the volume and velocity of data feeds, it might not be feasible to analyze all the contents of each individual file, only judiciously chosen samples. The feed inspection tool 130 may subscribe to the data feed management system 125 to receive the sampled feeds in order to keep up with the data arrival, and may utilize it to build statistical models 520 and signatures of individual attributes. A sampling approach may entail selecting a sample of records from each file, but this may be inefficient in the presence of this much data. Instead, the data feed management system 125 may sample files and include the files in their entirety in the feed of file content. In this example, experiments may be run to investigate the effect of sampling on the feed inspection tool's 130 model parameters and alerts 530. This may enable the feed inspection tool 130 to subscribe to the data feed management system 125 feed with the suitable level of sampling. File-level samples may be chosen in at least two ways: a panel approach, where a selected set of feeds may be sampled completely; and a random sampling approach where files may be selected at random. The data feed management system 125 may implement either sampling strategy as described herein.

A longitudinal sample or panel approach may be useful when the first or second users 101, 110 or subscribers 115-117 know ahead of time which feeds are of the greatest interest. The advantage of this strategy is that may provide assurance that nothing will be missed in the analysis of those feeds. The drawback may be the lack of information about the remaining feeds. The panel approach may not capture correlations with non-panel feeds, and it may not be able to accommodate new feeds. A random sample, on the other hand, may provide glimpses of all the feeds and may potentially capture correlations, but might require a larger sample to yield the desired level of robustness and accuracy. In this case, the panel consisted of 7 feeds that account for roughly 20% of the files handled by the data feed management system 125. The random sample for this experiment consisted of 20% of files arriving during any given day, selected at random. The experiment may be performed over a period of 30 days. Subsamples may be created from the panel and random samples to study the effect of sampling on the feed inspection tool's 130 output, the model feeds, M(F), and alert feeds, DQ(F). The following parameters may be included: (1) aggregation interval, (2) sampling proportion, (3) sliding window length and (4) statistical threshold. In this scenario, multiple combinations of these parameters may be tested, and some sample results are provided below.

Figure 9:
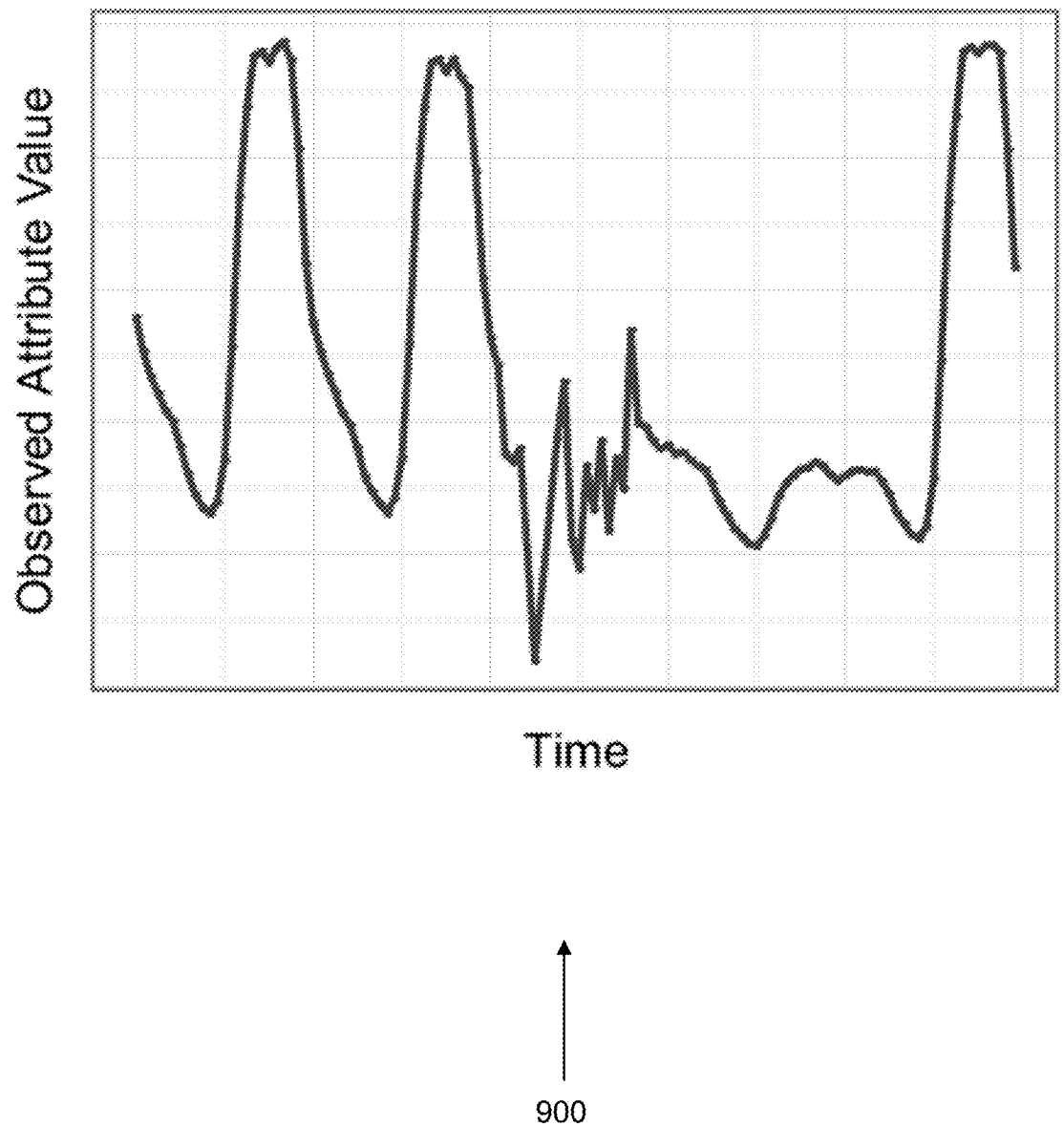
FIG. 9 illustrates a graph relating to an aggregation feed of the feed inspection tool, which illustrates peak and off-peak behavior over time.

For the purpose of an illustration relating to feed behavior, one attribute in one feed of the data feed management system 125 may be focused on. The methodology generalizes trivially to multiple feeds and attributes. Each file may contain hundreds of thousands of records every hour. FIG. 9 shows the behavior of the hourly aggregates A(F) for a variable with a clear cyclic pattern. The first two cycles, and the last cycle, show distinct troughs and peaks, while the third and fourth cycles have less range: they show off-peak behavior. The first off-peak cycle appears jagged and distorted. The distortion may have been caused by a disruption in data gathering—i.e. the arrival of files—rather than data measurement, which relates to the contents of the files.

Figure 10:
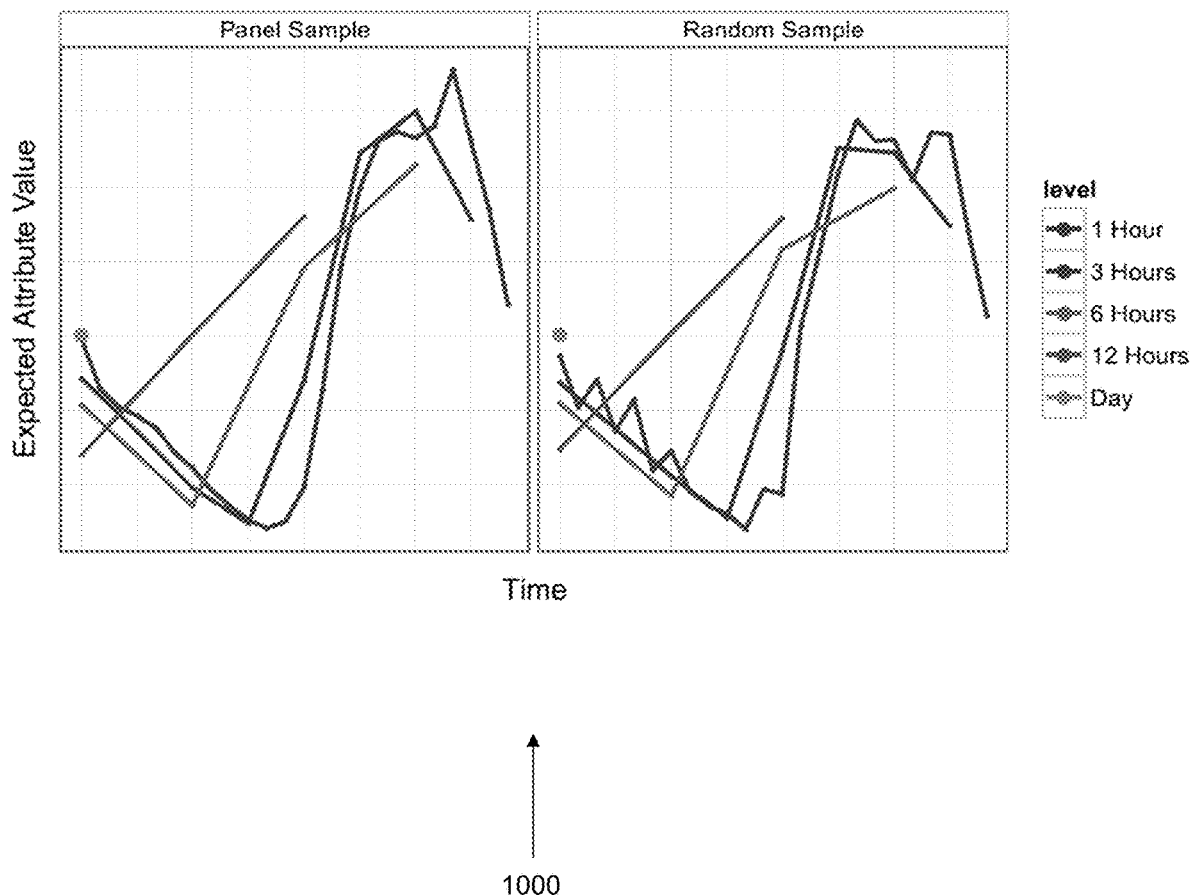
FIG. 10 illustrates a first graph depicting expected attribute values over time for a panel sample for a given feed and a second graph depicting expected attribute values over time for a random sample for a given feed.

As previously described herein, the feed inspection tool's 130 analysis module 410 uses the aggregate feed, A(F), which has been aggregated at multiple temporal scales. The aggregation interval may naturally influence the analyses and results. This is evident in the graph 1000 shown in FIG. 10, which shows the expected value of the example attribute over time for one day at five levels of aggregation for both the random sample and the panel sample. The pair of hourly curves is the most detailed as well as variable. It shows the difference between the panel and the random samples. In particular, the curve for the random sample fails to show the highest peak seen in the panel sample. At longer aggregation intervals, the aggregates are smoother and the estimates based on the random sample increasingly resemble the panel until the daily aggregates are identical for both. For the purposes of this example relating to feed behavior, the analyses may be based on 3 hour aggregation intervals since such an interval may captures enough structure to see the general shape even though some details may be lost.

Figure 11:
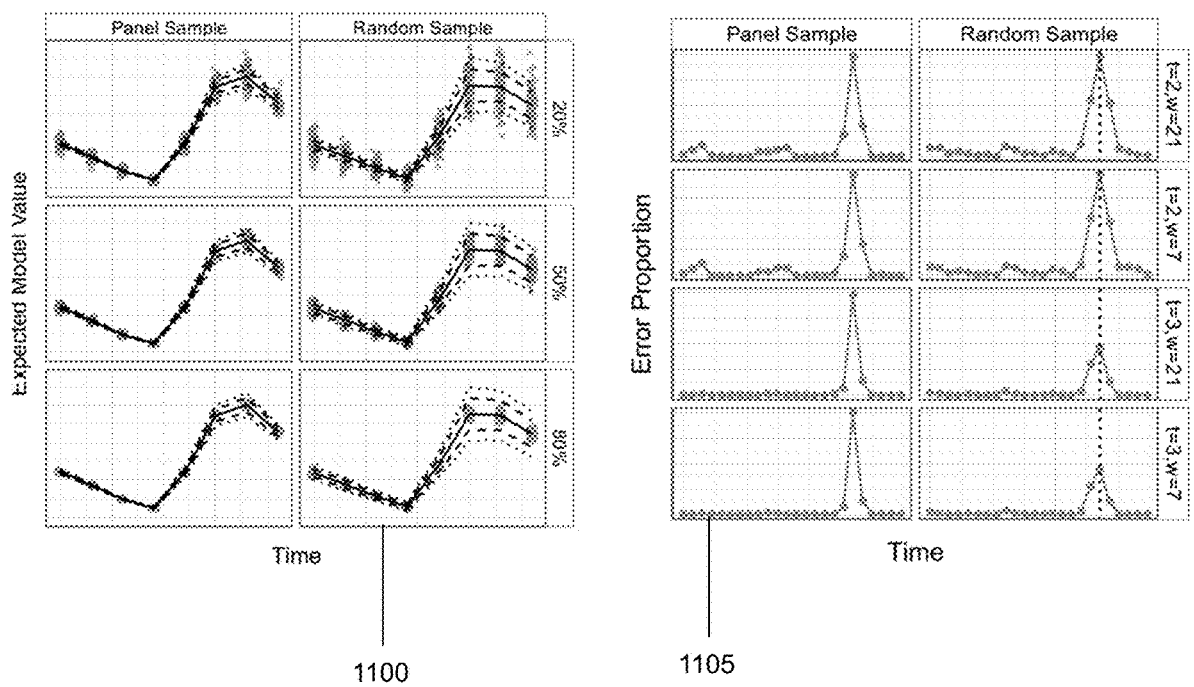
FIG. 11 illustrates a first graph depicting expected model values for panel samples and random samples and a second graph depicting error proportions for panel samples and random samples.

In another example, the choosing of a sample size for the feed inspection tool 130 may be performed. A sample size for the feed inspection tool 130 to subscribe to from the data feed management system's 125 feeds of files of various sampling proportions may be chosen. The discussion below compares three subsampling proportions. Subsampling proportions from 10% to 100% in increments of 10% were studied. Subsampling was performed from both of the original samples. A 50% random subsample of the panel sample may result in a 50% sample of the files in the panel, because the panel sample contains all files for a set of feeds. However, a 50% subsample of the random sample (a 20% sample) is equivalent to a 10% sample of the original data. The graphs 1100, 1105 in FIG. 11 show the effect of three subsampling proportions (20%, 50% and 80%) based on 100 replications each for the random sample and the panel sample. In effect, for the given feed and attribute in FIG. 11, the subsample sizes are effectively 20%, 50% and 80% for the panel sample, and 4%, 10% and 16% for the random sample. Each dot may represent the expected value of the average trimmed mean of the attribute in a given aggregation interval, for a given replication of the sample. There may be 100 such dots corresponding to 100 replications for each subsampling proportion, for each sample type. The trimmed mean may be one of the feed inspection tool's 130 model parameters. It provides a way of summarizing an attribute value because it is a stable estimate that measures the general behavior of the feed. It is more robust than the mean and more efficient than the median. In general, this holds for any other statistical estimate.

Figure 5:
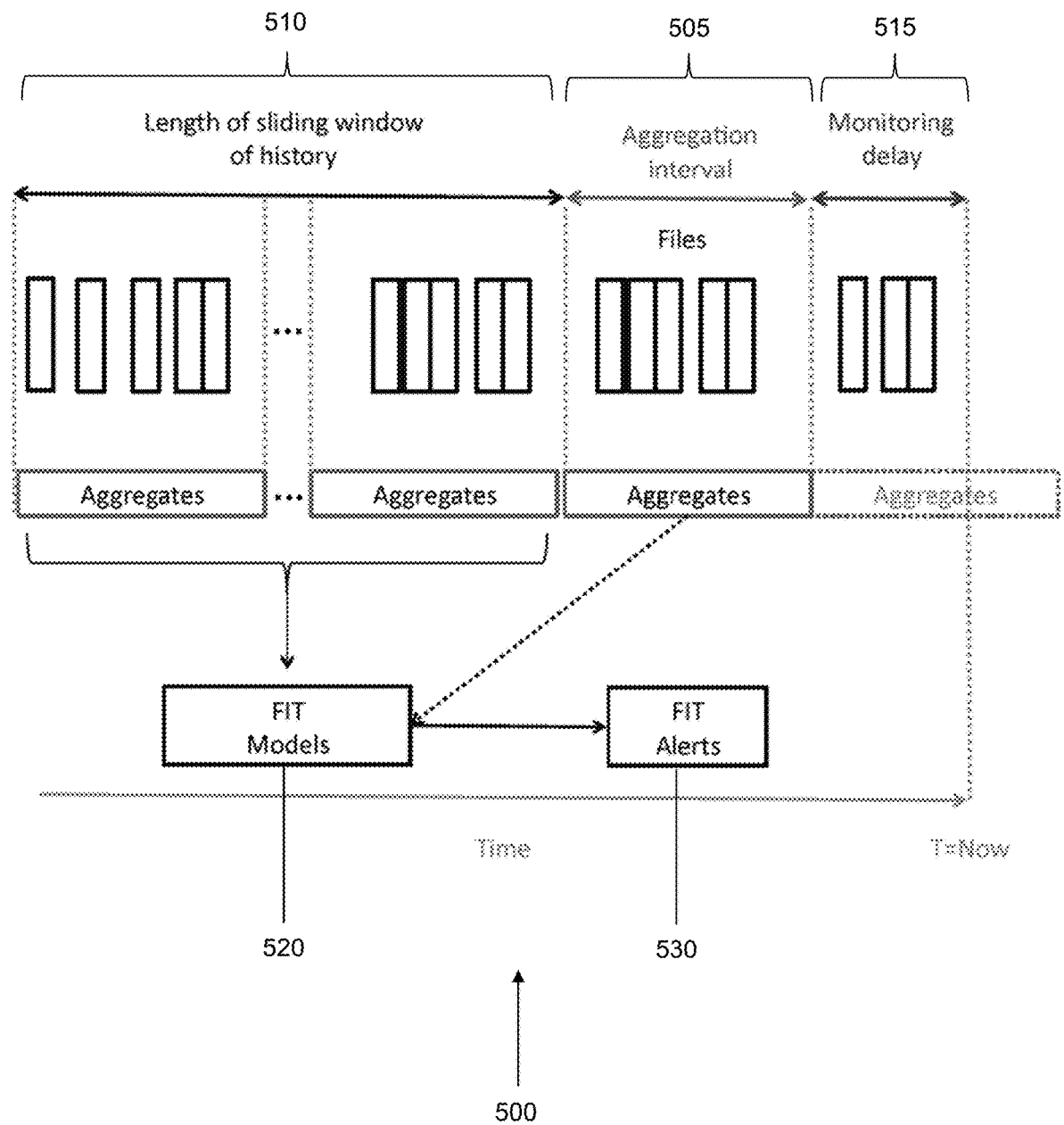
FIG. 5 illustrates the monitoring of feeds at multiple temporal scales that enables the control of sensitivity, adaptability, and stability for the feed monitoring process performed in the system of FIG. 1.

For each replication of the subsample, the feed inspection tool's 130 analysis module 410 created the model stream M(F) of the expected value based on the trimmed mean using the aggregates of the trimmed mean A(F) from the analysis module 410, at a scale of 21 day sliding window history as illustrated in FIG. 5. Computing the confidence interval for the trimmed mean may be difficult, however, the feed inspection tool's 130 analysis module 410 may utilize Student's t-statistic because the number of files is small. The solid lines in the plots 1100, 1105 represent the expected value of the average of trimmed means, while the dashed lines represent the 10% confidence intervals and the dotted lines represent the 5% confidence intervals. In the panel sample plots, the lines are model values based on the ground truth since they use all the data, while the lines in the random sample are based on the original 20% random sample. If the expected model values for a subsample fall within the confidence intervals of the "ground truth" expected values, then the subsample size may be acceptable. The smallest subsample size that meets this criterion is the ideal size. The panel samples include all files, and this is reflected in the tighter confidence bands in the plots in the left column, as well as in the tighter clustering of the sample estimates. This is expected since the samples are 20%, 50% and 80%. Now consider the random sample in FIG. 11, as shown in graph 1100. Random subsample sizes of 40% to 50% of the original 20% sample appear adequate. That is, for this particular attribute, a random sample of 8% to 10% gets close to the results obtained from a 20% random sample. The same pattern may be observed for other attributes and feeds, which indicates that an empirical approach to choosing sample size would work well.

In certain embodiments, the feed inspection tool's 130 models 520 may be tuned. Given an aggregation interval and sampling proportion, the feed inspection tool's 130 models 520 and alerts 530 may be influenced by two tunable modeling choices. One may be the length of the sliding window which contains the history for building models. The second may be the choice of statistical threshold for generating data alerts 530. The length of the sliding window may determine the ability of the feed inspection tool's 130 models 520 to adapt. Longer windows may dampen the effect of immediate events but may also take longer to reflect changes. Using window sizes of 7, 14 and 21 days, three different alerting thresholds were tested, depending on the test, to see how they influence the feed inspection tool's 130 output feeds, particularly DQ(F), the feed of data quality alerts. The rightmost portions in FIG. 11 show the proportion of alerts generated by the feed inspection tool 130 as a part of its DQ(F) output feed, for the example attribute over a 3-day period that includes the abnormality observed in FIG. 9. The error proportion represents the number of replications that generated an alert out of the total 100, at a 3-hour temporal aggregation for a 50% sampling rate (that is, a 10% random sample and a 50% panel sample). Each panel represents a different combination of window size and threshold for one of the two sampling methods. Lower thresholds generate more alerts, but the window size has little to no influence. Each plot of the alerts based on the random sample shows a spike corresponding to the abnormality in FIG. 9, as indicated by a vertical dashed black line. However, note that panel sample plots do not have a black dashed line, indicating that analyses based on the whole data did not generate an alert. For the purposes of this example, the panel sample data generated alerts at an aggregation interval of one hour, but not at higher levels of aggregation where the test just missed the threshold. However, all the sampling proportions, including the 50% panel sample shown in FIG. 11, alerted in a high proportion of replications. This example shows the importance of multi-scale alerting, where a blip might be masked at higher level of aggregation, or simply not be reported, i.e. a false negative, due to the statistical power of the test being less than 1.

Figure 12:
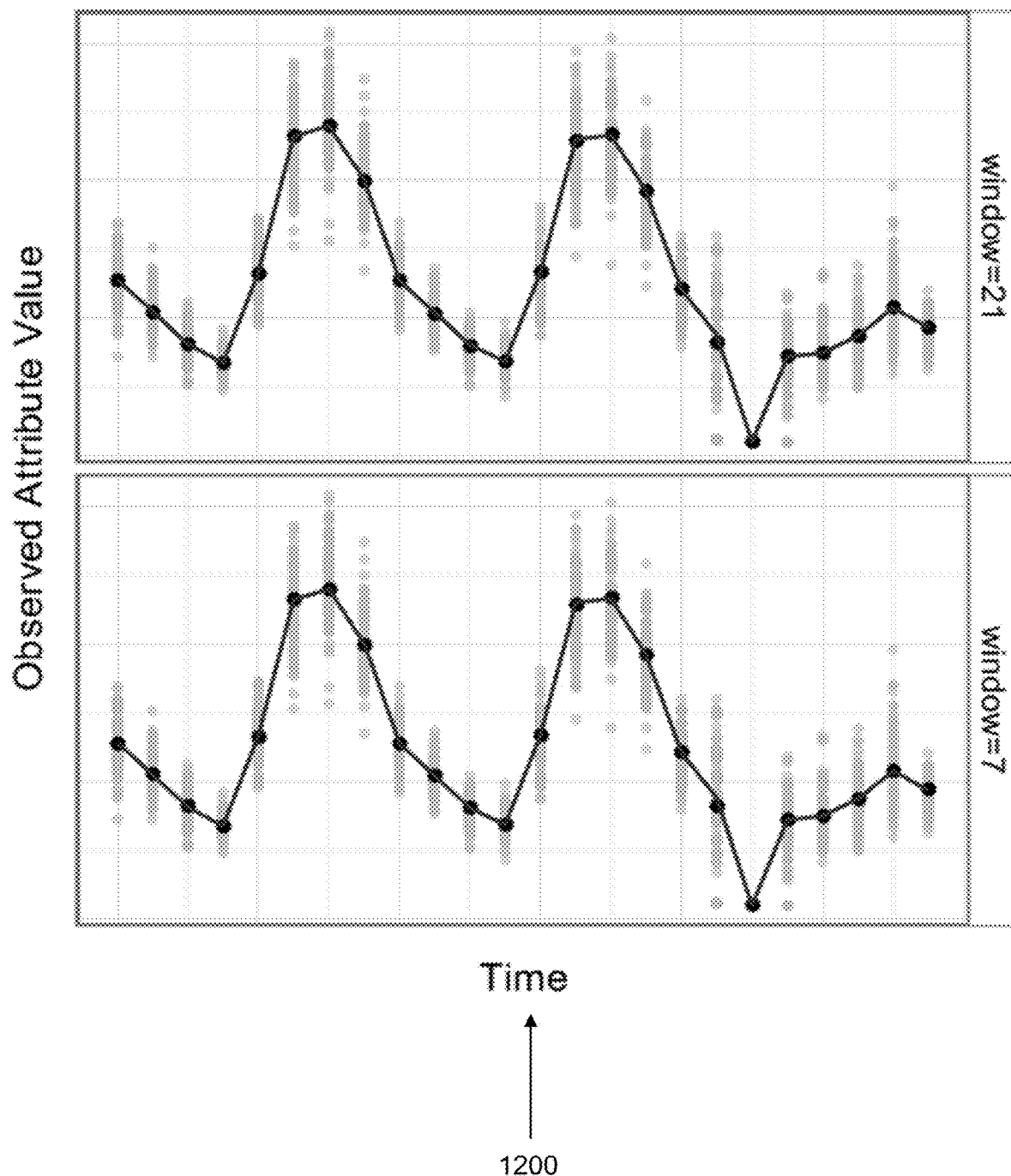
FIG. 12 illustrates graphs showing the difference between sampling files versus sampling the records from the files.

In terms of file sampling versus record sampling, the feed inspection tool's 130 models 520 may rely on the data feed management system 125 sampling entire files to avoid the overhead of parsing and reading. Based on experiments on a single feed to compare the feed inspection tool's 130 results based on file sampling versus record sampling, there was not a significant difference as evidenced by the graph 1200 in FIG. 12, which shows a three day period that corresponds to the first three days in FIG. 9. The solid line may be taken from the feed inspection tool's 130 model feed M(F), in this case the expected value of a given attribute derived from the full panel sample, and the grey dots from feed inspection tool 130 models 520 based on a 40% sample created by sampling entire files. The black dots represent the feed inspection tool's 130 models 520 based on a 40% sample created by sampling records from the files. The values of the feed inspection tool's 130 output stream M(F) from file samples versus record samples resemble each other quite closely. The conclusion is no surprise, for at least two reasons. First, the files are fairly big hence quite representative of the population. Second, there are no known a priori correlations within records of the same file other than perhaps temporal adjacency. Therefore, it is quite reasonable to sample at the file level.

When deploying the feed inspection tool 130 over a larger set of data feeds, the system 100 may automatically identify correlated outliers across multiple data feeds that indicate systematic errors. Additionally, semantic errors in the content of data feeds are often detected by subscribers during the process of data analysis. The data feed management system 125 may be enhanced to support each data feed subscriber 115-117 to act as a data quality feed publisher to provide data quality feedback. In certain embodiments, this may involve utilizing a standard format to represent subscribers' 115-117 feedback and a way for the feed inspection tool 130 to automatically incorporate such feedback into its feed quality analysis.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, subscribing to data feeds and metadata feeds associated with the data feeds, receiving the data feeds and the metadata feeds, aggregating, for a plurality of aggregation intervals, the data feeds and the metadata feeds into an aggregation feed, identifying, for a plurality of monitoring time delays, data outliers by comparing the aggregation feed for a current aggregation interval to the baseline model feed, generating data quality feeds based on the data outliers identified, publishing the data quality feeds so that subscribers may access the data quality feeds, and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIG. 1 illustrates a specific example configuration of the various components of the system 100, the system 100 may include any configuration of the components, which may include using a greater or lesser number of the components. For example, the system 100 is illustratively shown as including a first user device 102, a second user device 111, subscribers 115-117, publishers 120-123, a data feed management system 125, a feed inspection tool 130, a communications network 135, a server 140, a server 145, a visualizer 150, an email alerter 152, a server 160, a database 155, a data module 405, an analysis module 410, and an alerting module 415. However, the system 100 may include multiple first user devices 102, multiple second user devices 111, multiple subscribers 115-117, multiple publishers 120-123, multiple data feed management systems 125, multiple feed inspection tools 130, multiple communications networks 135, multiple servers 140, multiple servers 145, multiple visualizers 150, multiple email alerters 152, multiple servers 160, multiple databases 155, multiple data modules 405, multiple analysis modules 410, multiple alerting modules 415, or any number of any of the other components in the system 100. Furthermore, in certain embodiments, substantial portions of the functionality and operations of the system 100 may be performed by other networks and systems that may be connected to system 100.

Figure 13:
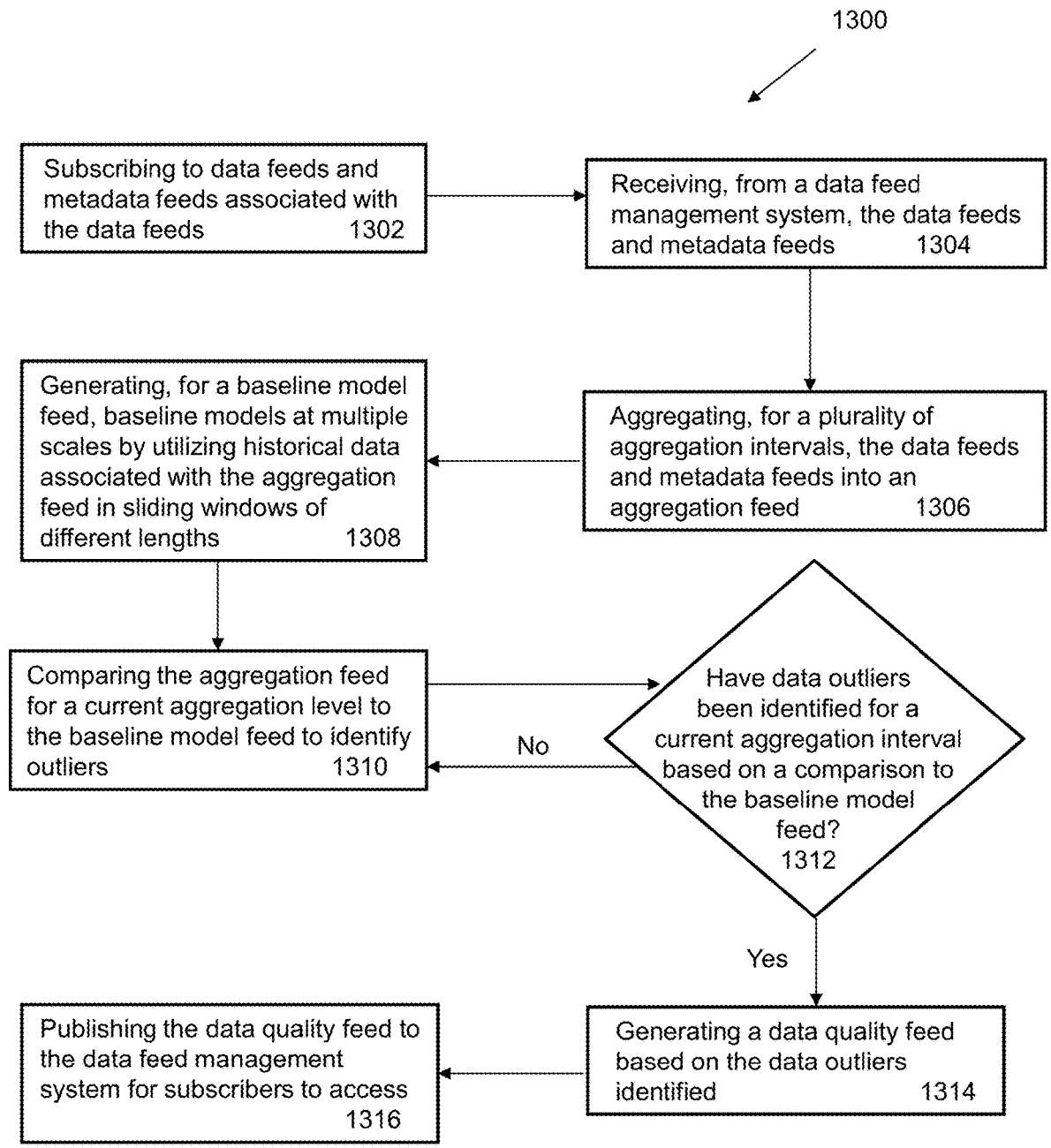
FIG. 13 is a flow diagram illustrating a sample method for providing continuous monitoring of data quality in a dynamic feed environment according to an embodiment of the present disclosure.
Figure 14:
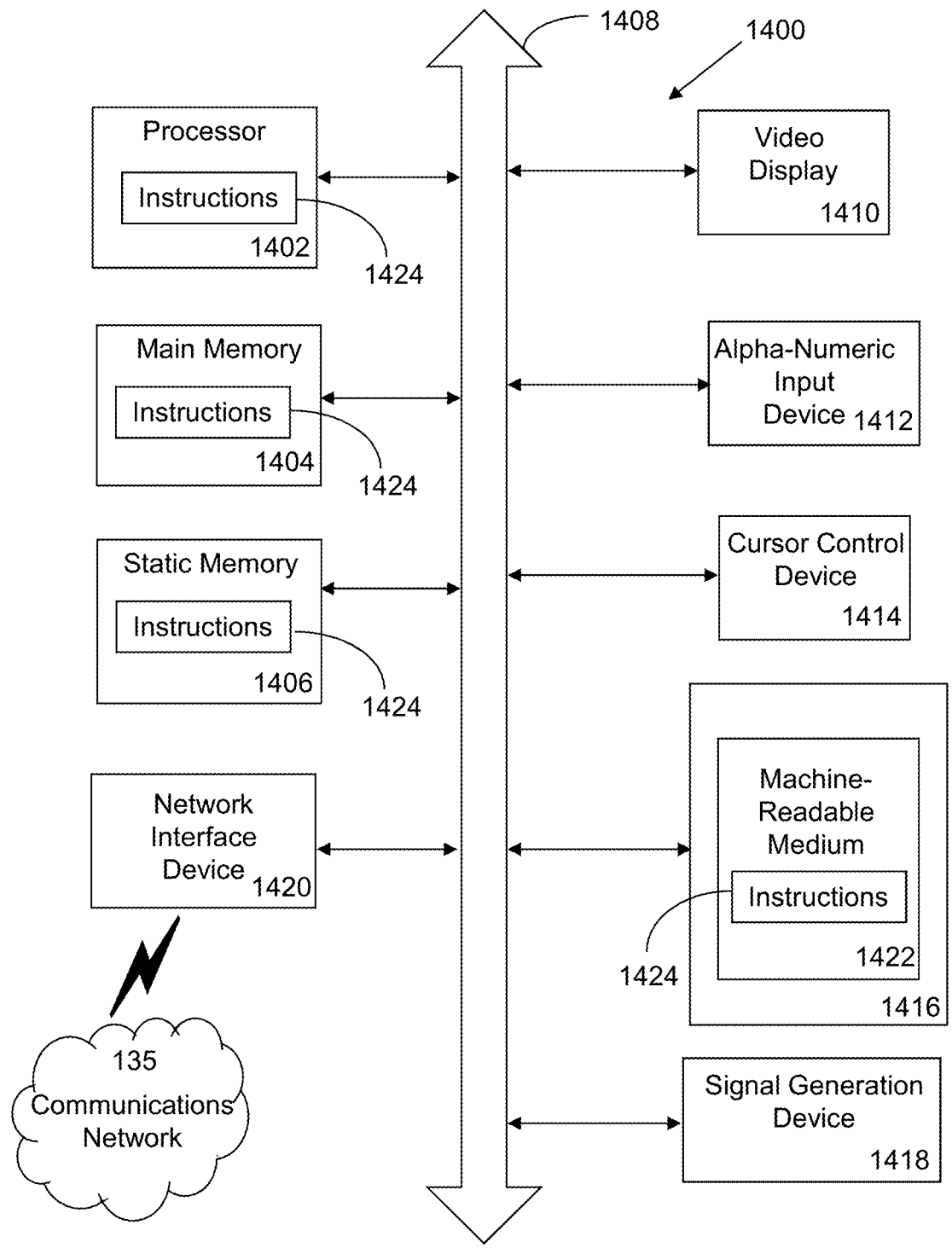
FIG. 14 is a schematic diagram of a machine in the form of a computer system within which a set of instructions, when executed, may cause the machine to perform any one or more of the methodologies or operations of the systems and methods for providing continuous monitoring of data quality in a dynamic feed environment.

As shown in FIG. 13, an exemplary method 1300 for providing continuous monitoring of data quality in a dynamic feed environment is schematically illustrated, and may include, at step 1302, subscribing to data feeds and metadata feeds associated with the data feeds. In certain embodiments, the subscribing may be performed by the feed inspection tool 130 via a publish-subscribe interface implemented by the data feed management system 125. In certain embodiments, the subscribing may be performed by utilizing the feed inspection tool 130, the subscribers 115-117, any combination thereof, or by any other appropriate program, system, or device. At step 1304, the method may include receiving, from the data feed management system 125, the data feeds and metadata feeds that were subscribed to in step 1302. In certain embodiments, the receiving may be performed by the feed inspection tool 130, the subscribers 115-117, any combination thereof, or by any other appropriate program, system, or device. The data feeds and metadata feeds may be obtained by the data feed management system 125 from the publishers 120-123, and then the feeds may be delivered to the feed inspection tool 130 or to any other subscriber 115-117 in the system 100.

At step 1306, the method 1300 may include aggregating, for a plurality of aggregation intervals, the data feeds and the metadata feeds into an aggregation feed. In certain embodiments, the aggregation may be performed by utilizing the feed inspection tool 130, the data module 405, any combination thereof, or by utilizing any other appropriate program, system, or device. Once the aggregation feed is generated by aggregating the data feeds and metadata feeds for a plurality of aggregation intervals, the method 1300 may include, at step 1308, generating, for a baseline model feed, baseline models at multiple scales. The baseline models may be generated by utilizing historical data associated with the aggregation feed that are based on sliding windows of different lengths. In certain embodiments, the generating may be performed by utilizing the feed inspection tool 130, the analysis module 410, any combination thereof, or by utilizing any other appropriate program, system, or device.

At step 1310, the method 1300 may identifying, for a plurality of monitoring time delays, data outliers by comparing the aggregation feed for a current aggregation interval to the baseline model feed. In certain embodiments, the identifying and the comparing may be performed by utilizing the feed inspection tool 130, the analysis module 410, any combination thereof, or by utilizing any other appropriate program, system, or device. At step 1312, the method 1300 may include determining if any data outliers have been identified for the current aggregation interval. In certain embodiments, the determining may be performed by utilizing the feed inspection tool 130, the analysis module 410, any combination thereof, or by utilizing any other appropriate program, system, or device. If data outliers have not been identified based on the comparison of the aggregation feed to the baseline model feed, the method 1300 may include reverting back to step 1310. The method 1300 may stay at step 1310 until data outliers are identified.

If, however, data outliers have been identified, the method 1300 may include generating a data quality feed based on the identified data outliers. In certain embodiments, the data quality feed may be generated by utilizing the feed inspection tool 130, the alerting module 415, any combination thereof, or by utilizing any other appropriate program, system, or device. Once the data quality feed is generated, the method 1300 may include publishing, to the data feed management system 125, the data quality feed so that the data quality feed is accessible to a subscriber 115-117 subscribing to the data quality feed. In certain embodiments, the data quality feed may be published by utilizing the feed inspection tool 130, the alerting module 415, any combination thereof, or by utilizing any other appropriate program, system, or device. One or more subscribers that have subscribed to the data quality feed, may then access the data quality feed for their own use. Reports and graphs may be generated that visual identify the data outliers and any other information relating to the data feeds and metadata feeds. Notably, the method 1300 may also incorporate any of the functionality and features as described for the system 100 or as otherwise described herein.

Referring now also to FIG. 1400, at least a portion of the methodologies and techniques described with respect to the exemplary embodiments of the system 100 can incorporate a machine, such as, but not limited to, computer system 1400, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, another network, or a combination thereof) to and assist with operations performed by other machines and systems, such as, but not limited to, the first user device 102, the second user device 111, the subscribers 115-117, the publishers 120-123, the data feed management system 125, the feed inspection tool 130, the server 140, the server 145, the visualizer 150, the email alerter 152, the database 155, the server 160, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 1400 may include a processor 1402 (e.g., a central processing unit (CPU), a graphics processing unit (GPU, or both), a main memory 1404 and a static memory 1406, which communicate with each other via a bus 1408. The computer system 1400 may further include a video display unit 1410, which may be, but is not limited to, a liquid crystal display (LCD), a flat panel, a solid state display, or a cathode ray tube (CRT). The computer system 1400 may include an input device 1412, such as, but not limited to, a keyboard, a cursor control device 1414, such as, but not limited to, a mouse, a disk drive unit 1416, a signal generation device 1418, such as, but not limited to, a speaker or remote control, and a network interface device 1420.

The disk drive unit 1416 may include a machine-readable medium 1422 on which is stored one or more sets of instructions 1424, such as, but not limited to, software embodying any one or more of the methodologies or functions described herein, including those methods illustrated above. The instructions 1424 may also reside, completely or at least partially, within the main memory 1404, the static memory 1406, or within the processor 1402, or a combination thereof, during execution thereof by the computer system 1400. The main memory 1404 and the processor 1402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 1422 containing instructions 1424 so that a device connected to the communications network 135, another network, or a combination thereof, can send or receive voice, video or data, and to communicate over the communications network 135, another network, or a combination thereof, using the instructions. The instructions 1424 may further be transmitted or received over the communications network 135, another network, or a combination thereof, via the network interface device 1420.

While the machine-readable medium 1422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device", or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system comprising:
a memory that stores instructions; and
a processor that executes the instructions to perform operations, the operations comprising:
passively monitoring, by utilizing a feed inspection tool of a computing device, data feeds and metadata feeds associated with the data feeds;
aggregating, for a plurality of aggregation intervals, the data feeds and the metadata feeds by combining the data feeds and the metadata feeds into an aggregation feed;
generating, for a baseline model feed and by utilizing model parameters provided by the feed inspection tool, baseline models at multiple scales, wherein the baseline models are generated by utilizing the feed inspection tool of the computing device;
identifying, for a plurality of monitoring time delays, data outliers by comparing the aggregation feed for a current aggregation interval to the baseline model feed; and
generating a data quality feed based on the data outliers identified, wherein a configurable subset of entire files are sampled by utilizing a longitudinal sample that is selected when a full feed rate for delivering the entire files is greater than a number of files a subscriber of the data feeds and the data quality feed is capable of handling, wherein a set of random files across the data feeds are also sampled when generating the data quality feed so as to capture correlations among the data feeds that are not capturable using the longitudinal sample.

2. The system of claim 1, wherein the operations further comprise deriving group-by variables and quantitative variables from the data feeds and the metadata feeds.

3. The system of claim 2, wherein the operations further comprise computing a statistical summary for the quantitative variables for each combination of the group-by variables.

4. The system of claim 1, wherein the operations further comprise receiving the data feeds and the metadata feeds from a data feed management system.

5. The system of claim 1, wherein generating the data quality feed further comprises generating the data quality feed based on sampling the configurable subset of the entire files in the data feeds instead of sampling all the entire files in the data feeds.

6. The system of claim 1, wherein the operations further comprise publishing the data quality feed so that the data quality feed is accessible to the subscriber of the data quality feed.

7. The system of claim 1, wherein the operations further comprise subscribing to the data feeds and the metadata feeds.

8. The system of claim 1, wherein generating of the baseline models at the multiple scales further comprises generating the baseline models by utilizing historical data associated with the aggregation feed in sliding windows of different lengths.

9. The system of claim 1, wherein the operations further comprise facilitating access to the data quality feed for additional subscribers.

10. The system of claim 1, wherein the operations further comprise generating a report or graph that visually identifies the data outliers.

11. The system of claim 1, wherein the operations further comprise receiving a request to access a logical alert feed of the data quality feed, wherein the logical alert feed includes alerts computed for a specified time delay.

12. The system of claim 1, wherein the operations further comprise detecting an error in processes associated with the data feeds.

13. The system of claim 1, wherein the operations further comprise generating a time series plot that includes the data outliers.

14. A method comprising:
monitoring, by utilizing a feed inspection tool of a computing device, data feeds and metadata feeds associated with the data feeds;
aggregating, for a plurality of aggregation intervals, the data feeds and the metadata feeds by combining the data feeds and the metadata feeds into an aggregation feed;
generating, for a baseline model feed and by utilizing model parameters provided by the feed inspection tool, baseline models at multiple scales, wherein the baseline models are generated by utilizing the feed inspection tool of the computing device;
determining, for a plurality of monitoring time delays, data outliers by comparing the aggregation feed for a current aggregation interval to the baseline model feed; and
creating, by utilizing instructions from a memory that are executed by a processor, a data quality feed based on the data outliers identified, wherein a configurable subset of entire files are sampled by utilizing a longitudinal sample that is selected when a full feed rate for delivering the entire files is greater than a number of files a subscriber of the data feeds and the data quality feed is capable of handling, wherein a set of random files across the data feeds are also sampled when generating the data quality feed so as to capture correlations among the data feeds that are not capturable using the longitudinal sample.

15. The method of claim 14, further comprising detecting a change in a distribution for records in the data feeds by analyzing contents of the data feeds.

16. The method of claim 14, further comprising outputting an alert based on the data outliers.

17. The method of claim 14, further comprising generating a report or graph that visually identifies the data outliers.

18. The method of claim 14, further comprising subscribing to an unmatched data feed, wherein the unmatched data feed does not match any logical feeds defined by the subscriber.

19. The method of claim 18, further comprising labeling unmatched files of the unmatched data feed to a data feed of the data feeds that shares a similarity to the unmatched files.

20. A computer-readable device comprising instructions, which when executed by a processor, cause the processor to perform operations comprising:
analyzing, by utilizing a feed inspection tool of a computing device, data feeds and metadata feeds associated with the data feeds;
aggregating, for a plurality of aggregation intervals, the data feeds and the metadata feeds by combining the data feeds and the metadata feeds into an aggregation feed;
generating, for a baseline model feed and by utilizing model parameters provided by the feed inspection tool, baseline models at multiple scales, wherein the baseline models are generated by utilizing the feed inspection tool of the computing device;
determining, for a plurality of monitoring time delays, data outliers by comparing the aggregation feed for a current aggregation interval to the baseline model feed; and
generating a data quality feed based on the data outliers identified, wherein a configurable subset of entire files are sampled by utilizing a longitudinal sample that is selected when a full feed rate for delivering the entire files is greater than a number of files a subscriber of the data feeds and the data quality feed is capable of handling, wherein a set of random files across the data feeds are also sampled when generating the data quality feed so as to capture correlations among the data feeds that are not capturable using the longitudinal sample.

* * * * *